(12) United States Patent
Kerner et al.

(10) Patent No.: US 11,726,045 B2
(45) Date of Patent: Aug. 15, 2023

(54) SYSTEM AND METHOD FOR TRACING A GEMSTONES JOURNEY FROM THE MINE TO THE CONSUMER BY DETECTING INCLUSIONS IN THE GEMSTONE

(71) Applicant: SARINE TECHNOLOGIES LTD., Hod Hasharon (IL)

(72) Inventors: Abraham Kerner, Herzliya (IL); Omri Spirman, Even Yehuda (IL); Shilo Stopper, Ramat Gan (IL)

(73) Assignee: SARINE TECHNOLOGIES LTD., Hod Hasharon (IL)

( * ) Notice: Subject to any disclaimer, the term of this patent is extended or adjusted under 35 U.S.C. 154(b) by 173 days.

(21) Appl. No.: 17/388,230

(22) Filed: Jul. 29, 2021

(65) Prior Publication Data

US 2021/0356402 A1 Nov. 18, 2021

Related U.S. Application Data

(63) Continuation-in-part of application No. 17/206,536, filed on Mar. 19, 2021, now abandoned, which is a
(Continued)

(30) Foreign Application Priority Data

Nov. 2, 2016 (IL) .......................................... 248717

(51) Int. Cl.
  *G01N 21/87* (2006.01)
(52) U.S. Cl.
  CPC .................................. *G01N 21/87* (2013.01)
(58) Field of Classification Search
  CPC ..................................................... G01N 21/87
  See application file for complete search history.

(56) References Cited

U.S. PATENT DOCUMENTS

| | | |
|---|---|---|
| 4,417,564 A | 11/1983 | Dodson |
| 6,239,867 B1 | 5/2001 | Aggarwal |

(Continued)

FOREIGN PATENT DOCUMENTS

| | | |
|---|---|---|
| CN | 202305982 | 7/2012 |
| CN | 102713582 | 10/2012 |

(Continued)

OTHER PUBLICATIONS

Office Action—Corresponding China Application No. 201780079030.8, dated Jun. 18, 2021, 15 pages.
(Continued)

*Primary Examiner* — Hina F Ayub
(74) *Attorney, Agent, or Firm* — ISUS Intellectual Property PLLC; Anthony Jason Mirabito

(57) ABSTRACT

There are provided method for detecting inclusions in a gemstone comprising illuminating the gemstone by successively producing illumination patterns on the gemstone each selected so as to simultaneously provide an internal uniform illumination of one or more predetermined light exit regions of the gemstone, and each being defined by a unique combination of spaced apart light entrance areas illuminated simultaneously from corresponding illumination directions. The method further comprises capturing a plurality of images of the gemstone when illuminated as indicated above, processing the images and identifying inclusions in the images based on non-uniformities in the internal illumination detected in the images. The illumination patterns can be produced by an illumination system configured to selectively illuminate the spaced apart light entrance areas of the gemstone from corresponding illumination directions. The illumination system can be controlled by a controller configured to cause the system to successively produce the illumination patterns. The images of the gemstone can be (Continued)

captured by an image acquisition device and processed by an image processing system configured for identifying inclusions based on non-uniformities in the internal illumination detected in the images.

25 Claims, 20 Drawing Sheets

Related U.S. Application Data continuation of application No. 16/344,665, filed as application No. PCT/IL2017/005118 on Oct. 31, 2017, now Pat. No. 11,016,032.

(56) References Cited

U.S. PATENT DOCUMENTS

| | | |
|---|---|---|
| 6,567,156 B1 | 5/2003 | Kerner |
| 6,980,283 B1 | 12/2005 | Aggarwal |
| 7,755,072 B2 | 7/2010 | Porat |
| 2005/0117145 A1 | 6/2005 | Altman |
| 2005/0213077 A1 | 9/2005 | Sasian et al. |
| 2010/0085635 A1 | 4/2010 | Verboven |
| 2012/0274751 A1 | 11/2012 | Smith et al. |
| 2014/0107986 A1 | 4/2014 | Sivovolenko |

FOREIGN PATENT DOCUMENTS

| | | |
|---|---|---|
| EP | 1795888 | 6/2007 |
| TW | 200530574 | 9/2005 |
| WO | 2008102361 | 8/2008 |

OTHER PUBLICATIONS

Search Report—Corresponding PCT Application No. PCT/IL2017/051184, dated Feb. 1, 2018, 6 pages.
Search Report—Corresponding European Application No. 17 86 6469, dated Apr. 28, 2020, 4 pages.

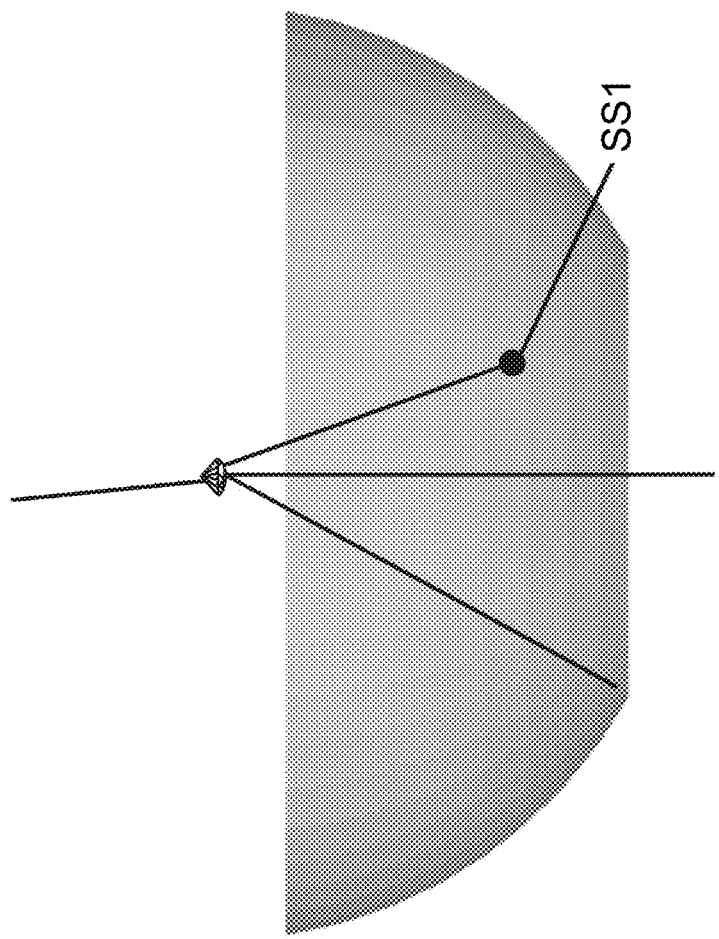
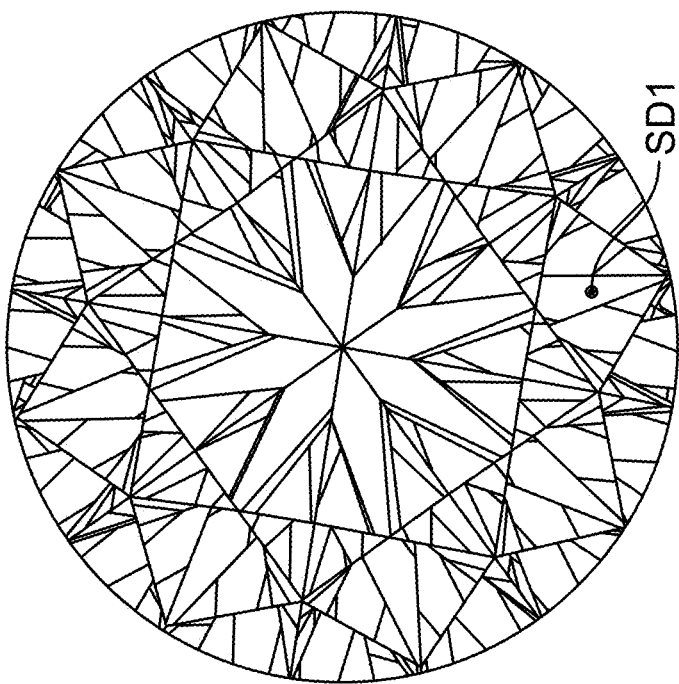
FIG. 5B
FIG. 5A

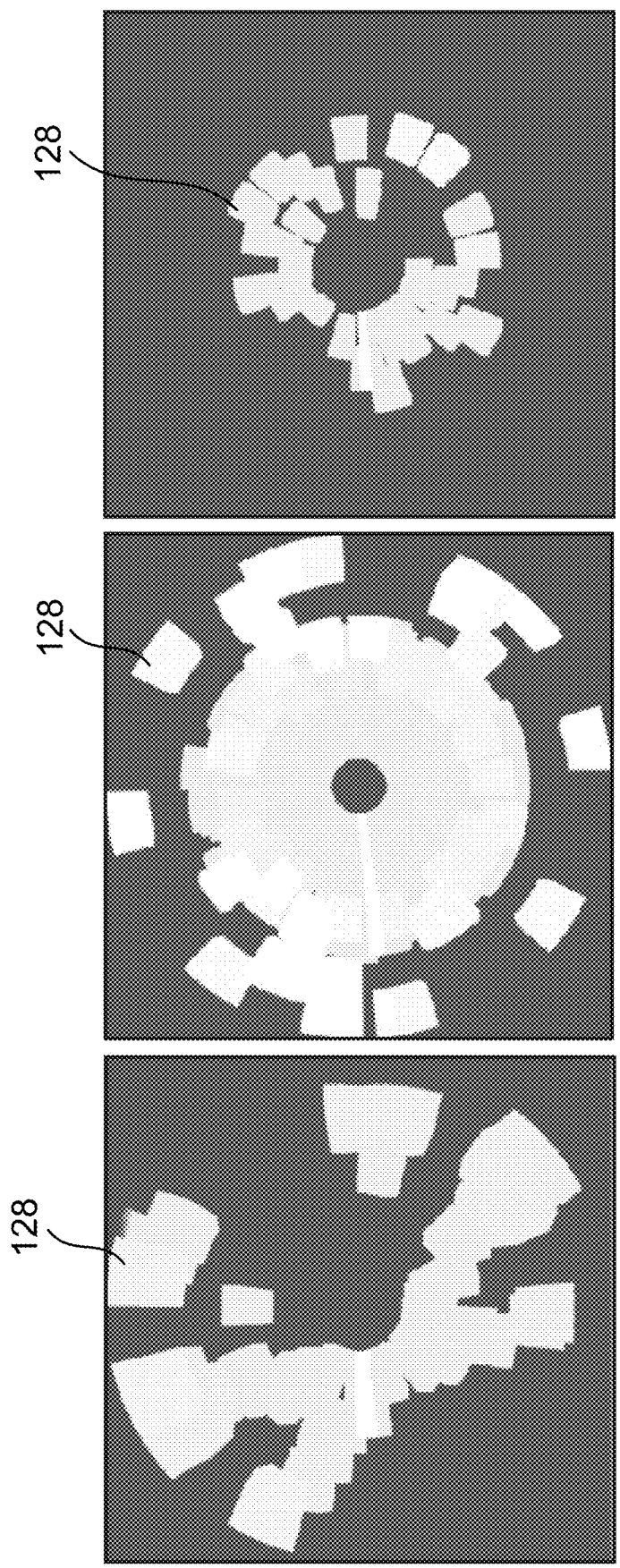

SYSTEM AND METHOD FOR TRACING A GEMSTONES JOURNEY FROM THE MINE TO THE CONSUMER BY DETECTING INCLUSIONS IN THE GEMSTONE

RELATED APPLICATIONS

This application is a continuation in part of U.S. application Ser. No. 17/206,536, filed Mar. 19, 2021, which is a continuation application of U.S. application Ser. No. 16/344,665, filed Apr. 24, 2019, which is a U.S. national phase application of PCT/IL2017/051184 filed Oct. 31, 2017, which claims the benefit and priority to Israel Application No. 248717, filed Nov. 2, 2016.

TECHNOLOGICAL FIELD

The invention relates to the field of detecting inclusions in gemstones, particularly, in cut diamonds for the purpose determining whether the inclusions uncovered are the same inclusions as found in another gemstone. If the inclusions match, or at least have a matching score, they are deemed to be one and the same gemstone. This technique is useful in tracing the journey of a gemstone from the mining site to the retailer of the finished/polished gemstone.

BACKGROUND

Attempts to develop systems and methods for detecting inclusions in diamonds have been made in the past though until now they do not seem to have led to commercially available results, that would provide a high degree of repeatability and could be used in automatic clarity grading of gemstones, particularly cut diamonds.

Examples of publications relating to detection of inclusions in cut diamonds for their clarity grading are US 20100086, US 20100088348, US 20140107986 and U.S. Pat. No. 6,980,283.

It has been found that many if not almost all gemstones contain inclusions and other defects. These inclusions not only affect the pricing of the gemstone, but also may serve as a way of identifying the source and the path a gemstone has traveled from the mine to the gemstone retailer. The inclusions found in a so-called rough gemstone may in some circumstances remain in the polished gemstone. As such, by examining a polished gemstone at the retailer, or earlier on during the process of producing a polished gemstone, the polished gemstone may be identified as being the same gemstone that was sourced from a particular mining site due to the identity or at least close relationship between the inclusions detected. A problem has been in the past that a quick and inexpensive mechanism has been heretofore unavailable. It is to ameliorate this situation that the present invention is directed.

SUMMARY OF THE PRESENT INVENTION

In an aspect, a system for detecting inclusions in a gemstone and determining whether a gemstone B being analyzed is the same gemstone as a gemstone A that was sourced from a particular mine/source includes: a first illumination system configured to selectively illuminate each of a plurality of spaced apart light entrance areas of gemstone A from corresponding illumination directions, and to provide a number of illumination patterns each defined by a unique combination of such light entrance areas illuminated simultaneously; a controller configured to control said illumination system to successively produce illumination patterns each selected so as to simultaneously provide an internal uniform illumination of one or more predetermined light exit regions of the gemstone; an image acquisition device configured to capture images of gemstone A when illuminated by the first illumination system; an image processing system configured for processing said images and identifying inclusions in gemstone A based on non-uniformities in the internal illumination detected in said images; and, a storage system including a computer memory to store the images of gemstone A from the image processing system; a second illumination system configured to selectively illuminate each of a plurality of spaced apart light entrance areas of gemstone B from corresponding illumination directions, and to provide a number of illumination patterns each defined by a unique combination of such light entrance areas illuminated simultaneously; a controller configured to control said illumination system to successively produce illumination patterns each selected so as to simultaneously provide an internal uniform illumination of one or more predetermined light exit regions of gemstone B; an image acquisition device configured to capture images of gemstone B when illuminated by the second illumination system as defined in item f.; an image processing system configured for processing said images and identifying inclusions in gemstone B based on non-uniformities in the internal illumination detected in said images; a storage system including a computer memory to store the images of gemstone B from the image processing system; and, the controller being configured for processing and for comparing the stored images of gemstone A and gemstone B, the controller being further configured to determine whether the stored images match or do not match.

In another aspect, if the stored images do not match, the controller is configured to calculate, based on the comparing, a matching score for the inclusions in gemstone A and in gemstone B, the matching score being informative of a match between the inclusions of gemstone A and gemstone B, and, the controller being configured to identify gemstone B as being the same or derived from gemstone A when the matching score meets a predefined matching criteria.

In a further aspect, a transparent table is configured for mounting a gemstone thereon so that, if the gemstone is a cut gemstone, its table facet faces the image acquisition device. The illumination system may comprise a first hemispherical illumination surface. The first hemispherical illumination surface is in the form of a first diffusively reflecting surface, and each of the first and the second illumination systems further comprise a first light source configured to selectively illuminates a plurality of zones on the first hemispherical illumination surface, the first reflecting surface and the first light source being disposed on two sides of the gemstone. The system may further comprise a second hemispherical illumination surface. The second hemispherical illumination surface may be in the form of a second diffusively reflecting surface, and the illumination system further comprises a second light source configured to selectively illuminates a plurality of zones on the second hemispherical illumination surface, the second reflecting surface and the second light source are disposed on the same side of the transparent table.

In yet another aspect, the system may have an optical axis passing through a center of the first hemispherical illumination surface, and the latter surface comprises an opening surrounding said axis. The illumination system may further comprise a third light source configured to illuminate the gemstone through said opening and/or the image acquisition device is configured to capture images of the gemstone through said opening. The controller may be configured to calculate the illumination pattern using a ray tracing model. The system may be configured to capture the images of the gemstone at a plurality of depths along its height.

In yet a further aspect, the image processing system may be configured to exclude false-positive detections, optionally obtained using one or both of the following: a simulation of the gemstone to recognize edges of the gemstone; imaging an outer surface of the gemstone, under illumination allowing to detect foreign particles on said outer surface. The system may include a dark-field illumination device, and the dark-field device may comprise a combination of reflecting surfaces and is configured to be mounted so as to receive light from the illumination system while preventing direct entry of light beams from this source into the image acquisition device.

In an aspect, a computerized method for detecting inclusions in a gemstone and determining whether a gemstone B being analyzed is the same gemstone as a gemstone A that was sourced from a particular mine/source, includes the steps of: (a) analyzing gemstone A by controlling an illumination system configured to selectively illuminate each of a plurality of spaced apart light entrance areas of the gemstone A from corresponding illumination directions, and to provide a number of illumination patterns each defined by a unique combination of such light entrance areas illuminated simultaneously, the controlling being configured to cause the illumination system to successively produce illumination patterns each selected so as to simultaneously provide an internal uniform illumination of one or more predetermined light exit regions of the gemstone; (b) capturing a plurality of images from the gemstone A when illuminated; analyzing gemstone B by repeating steps (a) and (b) for gemstone B; processing the images and identifying inclusions in said images for gemstones A and B, based on non-uniformities in the internal illumination detected in said images; and, comparing the processed images derived from gemstone A and gemstone B to determine whether the processed images match or do not match.

In another aspect, the method may further comprise, if the processed images do not match, calculating, based on the comparing, a matching score for the inclusions in gemstone A and the inclusions in gemstone B, the matching score being informative of a match between the inclusions in gemstone A and gemstone B; and, identifying gemstone B as being the same or derived from gemstone A, when the matching score meets a predefined matching criteria. The illuminating may be performed using a diffusively reflecting surface and at least one light source. If a gemstone is a cut gemstone, the plurality of images is captured from a viewpoint facing a table facet of the gemstone. The method may include providing a mapped illustration of detected inclusions within gemstones A and B.

In a further aspect, the illumination of said internal uniform illumination may be based on a ray tracing model, and the ray tracing model may be based on a 3D modelling of the gemstone. A further step may be to grade the clarity of a gemstone based on detected inclusions. The predetermined exit region may comprise at least one facet of a gemstone. The detection may comprise at least one of the following: comparing images of said predetermined light exit regions with their simulated images if these regions were illuminated uniformly; or detecting differentiation of illumination intensity of said regions relative to a predetermined intensity at said regions. The detection may use a simulation of the gemstone to recognize edges of the gemstone to reduce false-positive detections.

The illumination patterns for each gemstone to be detected can be calculated in a number of ways. One way includes using a ray tracing model, e.g., obtained based on 3D modeling of the gemstone. Such 3D modelling, the corresponding ray tracing and simulation of illumination patterns can all be performed by an external simulation system outside the detection system according to the presently disclosed subject matter. In this case, the controller of system of the presently disclosed subject matter can be configured to receive a sequence of instructions from said external simulation system, each defining the illumination pattern. Alternatively, the 3D modeling of the gemstone to be detected and the corresponding ray tracing can be performed externally by a ray tracing system, configured to output correlations between different light exit regions in the gemstone to be detected and their corresponding combinations of light entrance regions and directions of the incident and imaging beams. In this case, the system of the presently disclosed subject matter, can be configured to receive the information outputted from the above ray tracing system, and make a decision on the illumination patterns.

The illumination patterns calculated as described above can constitute initial illumination patterns, which the controller of the detection system of the presently disclosed subject matter can be configured to use in an initial, pre-detection operation of the system, said pre-detection operation being configured to result in the controller's calculation of adjustments, if any, to be performed in the initial illumination patterns for their use as final illumination patterns in the detection operation of the system.

Alternatively, the initial illumination patterns can be manually input by the operator or can be pre-stored in the controller's memory so as to allow the operator to select those he considers to be appropriate to the particular gemstone to be detected or to input in the system information regarding such gemstone, based on which the controller can select the initial illumination patterns.

The image acquisition device of the above detection system can further be configured for capturing the images of the gemstone at a plurality of imaging depths in the gemstone.

The image processing can be configured to identify said non-uniformities in said images using at least one of the following:
i) comparing images of said predetermined light exit regions with their simulated images calculated as if these regions were illuminated uniformly; or
ii) comparing illumination intensity of said regions in said images relative to a predetermined intensity;
iii) comparing illumination intensities at pixels indicative of illumination intensities of said regions, relative to that of their surrounding pixels.
iv)

The image processing system can be configured to exclude false-positive detections when identifying inclusions.

The system can further comprise a dark-field illumination device. Such device can comprise a combination of reflecting surfaces and can be configured to be mounted so as to receive light from the first light source mentioned above and re-directing it onto the gemstone while preventing direct entry of light beams from this source into the image acquisition device.

The gemstone can be a cut gemstone, in which case the plurality of images can be captured from a viewpoint facing the table facet of the gemstone.

The system can further be configured to provide a mapped illustration of detected inclusions within the gemstone.

The system can further be configured for grading the clarity of the gemstone based on detected inclusions.

According to another aspect of the present presently disclosed subject matter there is provided a method for detecting inclusions in a gemstone, comprising:

(a) controlling an illumination system configured to selectively illuminate each of a plurality of spaced apart light entrance areas of the gemstone from corresponding illumination directions, and to provide a number of illumination patterns each defined by a unique combination of such light entrance areas illuminated simultaneously, to successively produce illumination patterns each selected so as to simultaneously provide an internal uniform illumination of one or more predetermined light exit regions of the gemstone;

(b) capturing a plurality of images of the gemstone when illuminated as defined in step (a), optionally at different imaging depths; and (c) processing the images and identifying inclusions in said images based on non-uniformities in the internal illumination detected in said images.

The above method can further comprise any of steps/operations described above with respect to the system according to the first aspect of the presently disclosed subject matter.

In accordance with a still further aspect of the presently disclosed subject matter there is provided an add-on darkfield illumination device for use in a system comprising a table having a central axis for placing a gemstone thereon and a light source spaced from the table along the axis so as to face the gemstone. The device comprises an annular flat wall with a horizontal reflecting surface, having a central circular hole and configured to be placed on the table so that the hole is coaxial with the central axis and surrounds an area on the table where the gemstone is to be placed and so that the reflecting surface faces the light source. The device further comprises a first-conical wall with an inclined reflecting surface spaced from the horizontal reflecting surface along the central axis, the arrangement being such that, when the device is placed on the table, light beams from the light source emitted towards the horizontal reflecting surface are reflected thereby towards the inclined reflecting surface, which then reflects the beams towards the central circular hole.

In an aspect, system for detecting inclusions in a gemstone comprises: a controller configured to direct an illumination system, an image acquisition device, an image processing system, and a storage system; the illumination system is configured to selectively illuminate each of a plurality of spaced apart light entrance areas of a gemstone from corresponding illumination directions, and to provide a number of illumination patterns each defined by a unique combination of such light entrance areas illuminated simultaneously, and produce illumination patterns to simultaneously provide an internal uniform illumination of one or more predetermined light exit regions of the gemstone; the image acquisition device is configured to capture images of the gemstone when illuminated by the illumination system; the image processing system is configured to process said images and identifying inclusions in the gemstone based on non-uniformities in the internal illumination detected in said images; the storage system includes a computer memory configured to store the images of the gemstone from the image processing system; the controller is further configured to compare a gemstone A to a gemstone B by: i. directing the image acquisition device to capture images of the gemstone A and the gemstone B, ii directing the image processing system to analyze the images for the gemstone A and the gemstone B identifying inclusions, iii storing, in the storage system, images of the gemstone A and the gemstone B from the processing system, and iv comparing the stored images of a gemstone A and the gemstone B, and determining whether the stored images of the gemstone A and the gemstone B are a match and therefore whether a gemstone B is the same gemstone as a gemstone A that was sourced from a particular mine/source.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 5A and 5D each illustrates a top view of a cut diamond with a schematic indication of a spot to be internally illuminated;

FIGS. 5B and 5C are respective side and plan views of a lower hemisphere and table of the device shown in FIGS. 2A to 3, with a cut diamond disposed on the table and a schematic indication of an area on the lower hemisphere, from which a light beam has to be reflected towards the cut diamond to have such a trajectory within the cut diamond as to provide internal illumination of the spot thereon shown in FIG. 5A;

FIGS. 6A-6C are plan views of the lower hemisphere with areas thereof illuminated by a projector of the device shown in FIGS. 2A to 3, in different illumination patterns;

DETAILED DESCRIPTION OF THE PREFERRED EMBODIMENT

Figure 12:
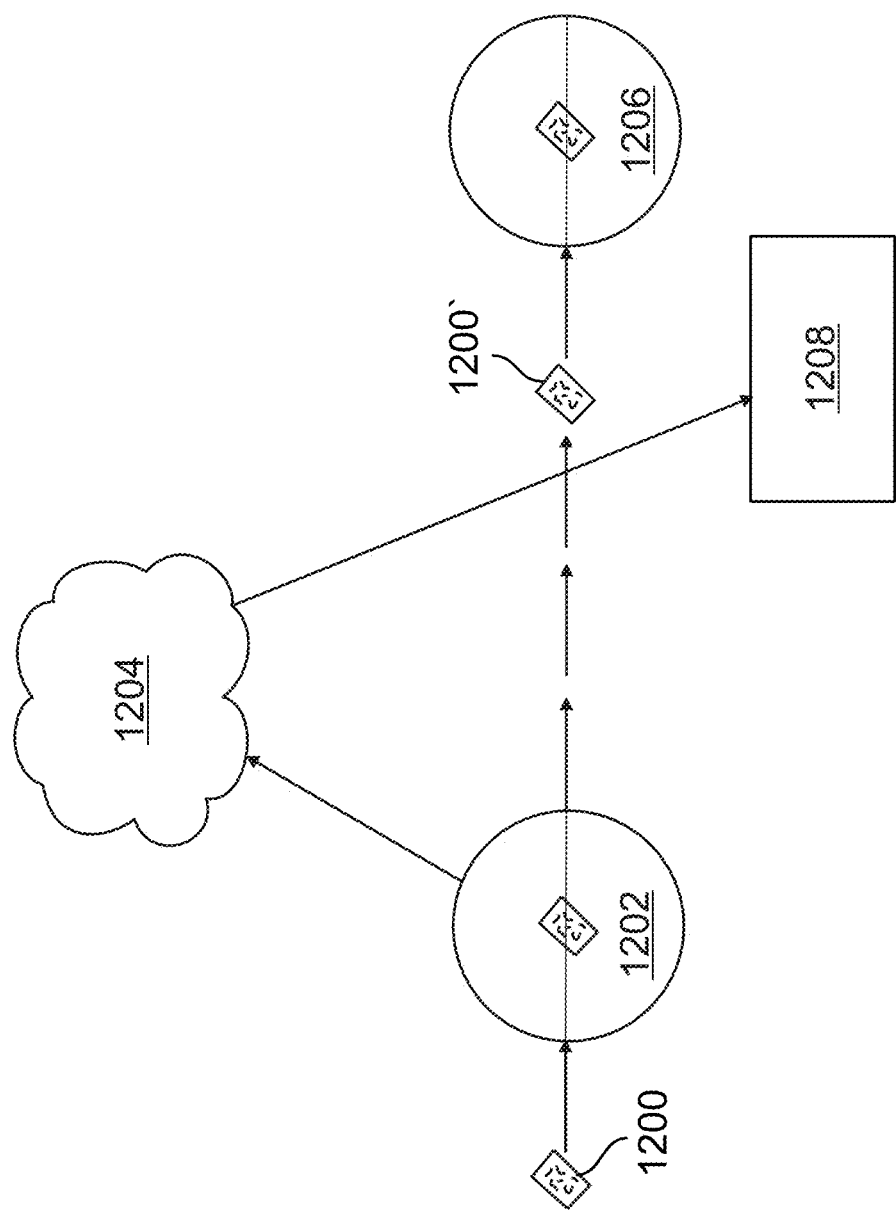
FIG. 12 illustrates a system of gemstone tracing in accordance with the present invention.

FIG. 12 illustrates a system in accordance with the present invention for tracing the path or journey of a gemstone or gemstones from the place where they are mined to the retailor of the polished gemstone.

Figure 1:
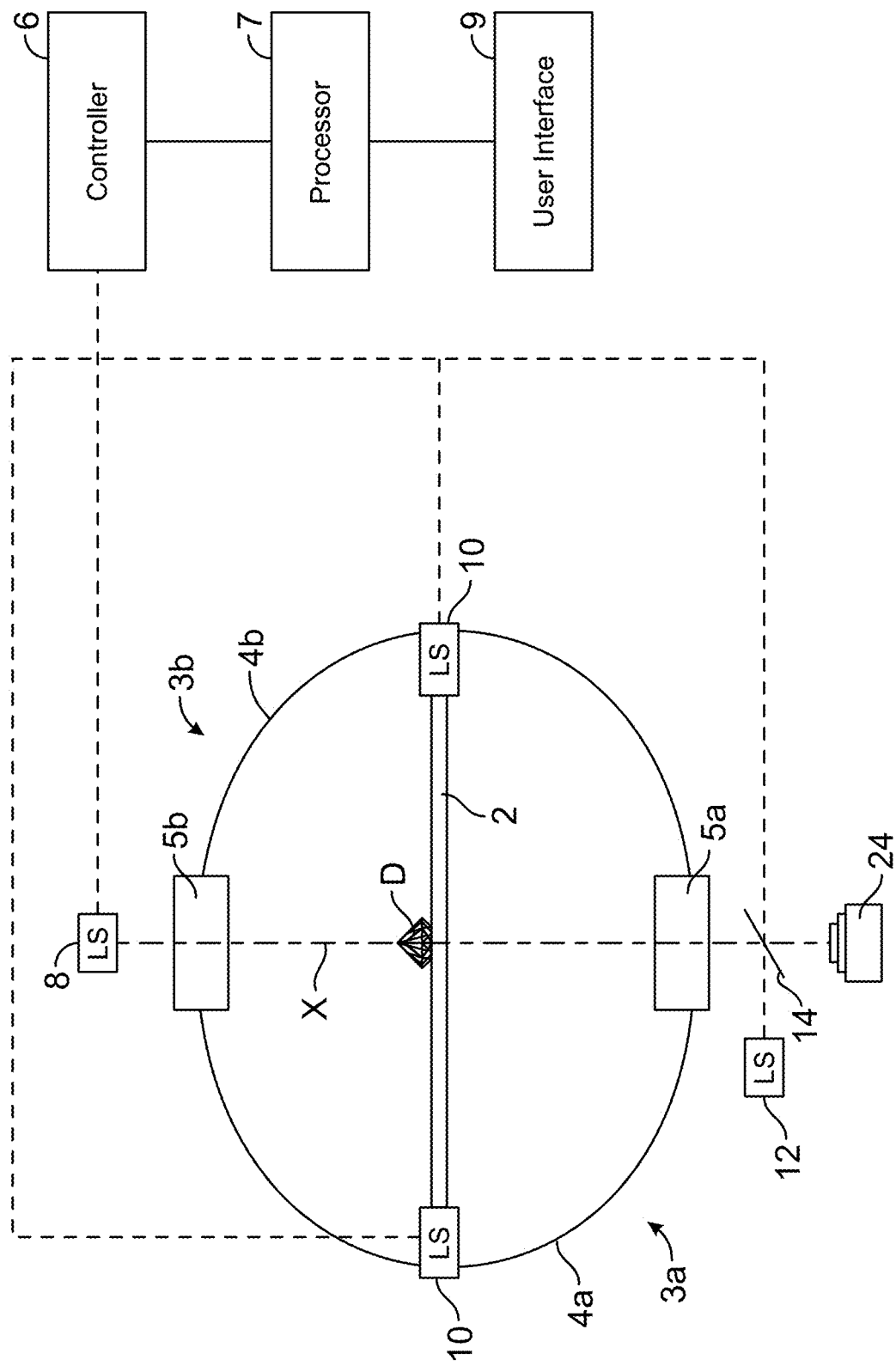
FIG. 1 is a schematic illustration of a general optical set-up of a device for detecting inclusions in a gemstone that is usable with the system of FIG. 12.

In FIG. 12, a rough diamond 1200 is extracted from the mine and at the mine or a near site, the diamond in placed inside the (or a like) device 1202 according to FIG. 1. The rough diamond is then tested to produce one or more images of the inclusions therein. The images may then be stored in the cloud 1204 for further analysis.

As is known, a diamond's "journey" from the mining site to the retailer may take a number of steps, in which the diamond may be analyzed to determine what the finished diamond or diamonds derived from the rough stone will be produced, using a device such as the Galaxy and Advisor software made by the assignee of the present invention, Sarine Technologies. After having been examined, the diamond may be cut/cleaved into separate subparts, then polished to enhance appearance.

When a diamond 1200' which is presumed to be the same diamond or at least a part of the diamond 1200 arrives at the retailer or at an earlier stage, the diamond 1200' may then be placed in a device 1206, preferably one which is of the same type and design as the device 1202. The diamond 1200' is then tested to detect the presence of inclusions (or other imperfections) and images taken of the inclusions and their positions within the diamond. The image file of the diamond 1202, which had been stored in the cloud 1204, may then be downloaded into a computer 1208 at the retailer or wholesaler site and the image file derived from the device 1206 compared with the image file from the diamond 1200 derived from the device 1202. Computer 1208 may include a conventional processor, a conventional memory device and programs which interact with the processor and the memory device.

During the processing of the diamond 1202 from a single rough diamond to one or more polished diamonds, some of the inclusions may have been removed by the cleaving/cutting and/or polishing steps, so that there may not be a 1 to 1 identity of the inclusions in diamond 1202 to diamond 1200'. However, it may be that some of the inclusions may remain present in diamond 1200'. If there are sufficient similarities in the inclusions in diamond 1202 and diamond 1202', then the computer under suitable programming may determine a "score" to suggest whether it can be reliably determined that the diamonds 1200 and 1200' are one and the same diamond and this have a matching score. One methodology that may be employed to "score" similarities may be derived from the disclosures in U.S. Pat. Nos. 10,387,723 and 11,017,224, which are assigned to the same assignee as the present application and which are herein incorporated by reference in their entirety.

FIG. 1 illustrates schematically a system 1 according to one example of presently disclosed subject matter, has a central axis X and comprises an illumination system including a lower illumination sub-system 3a and an upper illumination sub-system 3b, a table 2 therebetween configured for the placement of a diamond D thereon in alignment with the central axis X so as to expose the diamond to illumination produced by each of the sub-systems; and an image acquisition device 24 coaxial with the central axis and configured to capture images of the diamond when mounted on the table and illuminated by the illumination sub-systems. The table can constitute a bottom of a container configured for carrying an immersion medium, if desired. Such medium can be of the kind having a refraction index higher than that of the air and being transparent at the room temperature. The amount of the immersion medium can such as to allow it either to surround the entire diamond or only its part, e.g., its table facet, to reduce the amount of direct reflections therefrom. In addition, conditions can be provided in the system suitable for using the medium.

In the described example, the diamond D is placed on the table so that its table facet faces in the direction of the lower illumination sub-system 3a, and the table 2 is transparent to illumination, by which this sub-system is configured to illuminate the diamond so that light beams originated from the lower illumination sub-system pass through the table prior to their impinging the diamond.

In the described example, the lower illumination sub-system 3a comprises a lower illumination surface 4a and the upper illumination sub-system 3b comprises an upper illumination surface 4b, each formed with an opening 5a and 5b, respectively. The image acquisition device 24 is disposed at a distance from the opening 5a and is configured to view through this opening the table 2 at least at its central area where the diamond is to be disposed.

The lower illumination surface is configured to receive, via the table 2, light from a first light source 8 mounted within or in the vicinity of the opening 5b in the upper illumination surface 4b and to diffusively reflect it so that at least a part of the reflected light can reach the diamond, again through the table 2. The first light source 8 in the described example is in the form of a projector that can create any desired illumination pattern and thus illuminate a plurality of selected zones of desired geometry on the lower illumination surface 4a. The manner, in which these zones are selected will be described in more detail further in the present specification, though already at this stage it can be indicated that the selection is such as to illuminate the diamond at pre-determined areas/facets thereof with the light beams reflected from the above zones in pre-determined directions.

The lower illumination sub-system 3a further includes a beam splitter 14 disposed on the central axis X between the image acquisition device 24 and the opening 5a, and a second light source 12 spaced from the central axis X and disposed with respect to the beam splitter so as to direct light, by means of the beam splitter, to the table 2 along the axis X, to enable illuminating the table facet of the diamond through the table 2. The beam splitter is further configured to allow imaging light beams exiting the diamond in the direction of the opening Sa to pass through the beam splitter towards the image acquisition device 24.

The upper illumination sub-system 3b comprises an upper illumination surface 4b configured to receive light from a third light source 10 and to diffusively reflect it so that at least a part of the reflected light can illuminate the diamond from above. The third light source 10 in the described example has an annular configuration and it is disposed at the periphery of the table 2 or at least closer to the table than to at least a majority of the upper illumination surface 4b. The third light source 10 can be configured so as to create any desired illumination pattern on the upper illumination surface 4b. For example, the third illumination source can be in the form of a plurality of LEDs that can be individually controlled.

It is to be noted that each light source of the illumination sub-system can be configured to provide visible and/or UV and/or IR illumination, and they can all provide the same or different kinds of illumination depending on the purpose for which it is used. Thus, for example, UV illumination can be used when it is desired to exclude false-positive detections caused by dust or other foreign particles on the outer surface of the diamond, as described in more detail below.

The lower and upper illumination surfaces 4a and 4b in the present example are each in the form of a continuous diffusively reflecting surface of a hemispheric shape, though any or each of them can be in the form of a plurality of discrete small reflectors, which can be stationary or moveable to change their orientation relative to the central axis of the system.

Moreover, the structure of the lower and upper illumination sub-systems does not necessarily need to be as described above, in order to illuminate pre-determined areas on the diamond as desired. For example, any or each of the lower and upper illumination surfaces can be in the form of a plurality of individually controllable light emitters, in which case the system does not need to include the first light source 8 and/or the third light source 10, respectively. In case the lower illumination surface 4a is designed in this manner, the table 2 would need to be transparent only at its area configured to contact the table facet of the diamond. Furthermore, the table 2 can be in the form of a holder configured to hold the diamond at its girdle so as to directly expose it to the illumination from the lower and upper illumination sub-systems.

Figure 10A:
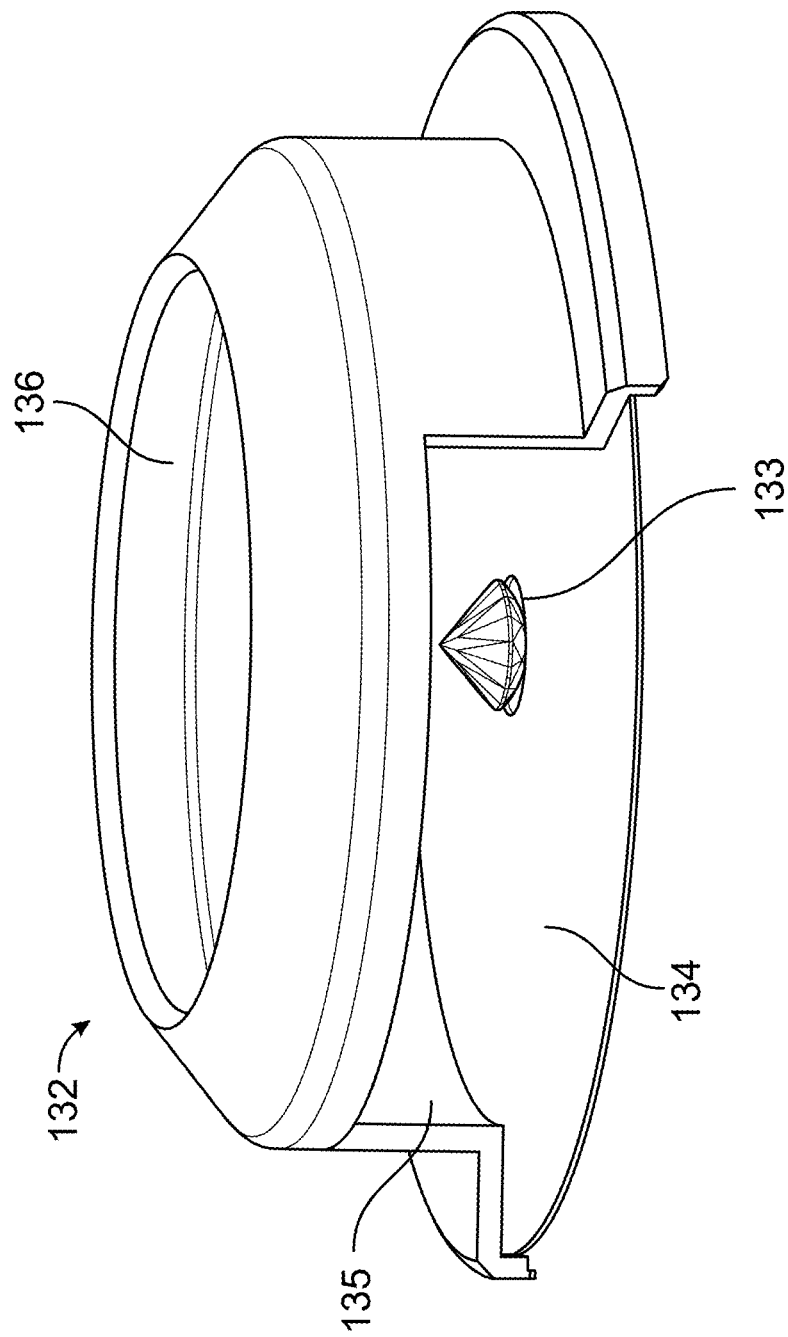
FIG. 10A is a perspective view of a dark-field illumination device configured for use in the device shown in FIGS. 1 to 3.

The illumination system 3 can comprise add-on components configured to be used with one or more of the light sources 8, 10 and 12, to provide illumination different from that provided by the lower and upper illumination sub-systems. One example of such add-on component is a dark-field illumination device configured to be used with the light source 8 and mounted above the table 2 so as to prevent any light from the light source 8 from directly reaching the table 2 and so as to receive light from the light source 8 in a pre-determined pattern for directing it as side illumination to the diamond for imaging inclusions that cannot be detected as desired using the illumination sub-systems 3a and 3b. One specific example of such dark-field component is shown in FIG. 10A.

In case the image acquisition device has a relatively short depth of focus, the system can further comprise an actuator (not shown in FIG. 1) for manipulating the image acquisition device 14 so as to move the focal plane thereof along the central axis X and thereby enable it to scan the diamond, slice by slice, along the central axis X. Alternatively or in addition, the image acquisition device can have a variable depth of focus to suit different sizes of diamonds.

The system 1 further comprises a controller 6 configured to control its operation and, particularly, the operation of its illumination sub-systems 3a and 3b so as to selectively simultaneously illuminate in a pre-determined manner pre-determined entrance areas on the diamond.

More particularly, the controller 6 can operate the illumination sub-systems to provide such pattern of illumination beams simultaneously entering the diamond, that corresponding imaging beams simultaneously exiting the diamond, usually the entering areas are different from the exiting regions, and forming its image at the image acquisition device are distributed at predetermined exit regions more uniformly than in other regions of the diamond, for using images of the pre-determined exit regions for detecting inclusions in the diamond as described in more detail below. In other words, prior to exiting the diamond at the pre-determined exit regions, the light beams which entered the diamond in the corresponding pre-determined entrance areas from corresponding pre-determined directions, undergo predicted internal reflections and create an internal illumination of the corresponding exit regions, with a higher uniformity compared with the remainder of the diamond. The exit regions that can be simultaneously internally illuminated in the 'more uniform' manner as described above, can be one or more facets of the diamond that are seen in the top view thereof. For example, they can be two adjacent crown facets, full table or a part thereof or even the entire diamond. The number of the illumination patterns, which the illumination system will need to create will thus be defined by the number of combinations of the exit regions that are to be simultaneously uniformly internally illuminated.

The controller can also control the acquisition device such that it synchronizes the image capturing sessions with the production of the illumination patterns by the illumination system.

For the determination of the exit regions and the corresponding entrance areas, the diamond can first be scanned to obtain its 3D model, and its ray tracing and illumination simulation can be performed using the 3D model and the optical set-up of the system. Having said that, it is possible to perform the above determination without modeling the diamond. For example, generic, pre-stored illumination patterns can be applied to the diamond in the system and based on achieved internal illumination intensities at the light exit regions, entrance areas, corresponding illumination patterns and/or illumination intensities at the entrance areas can be adjusted by trial and error, to achieve the desired uniformity of internal illumination of the exit regions.

Figure 4A:
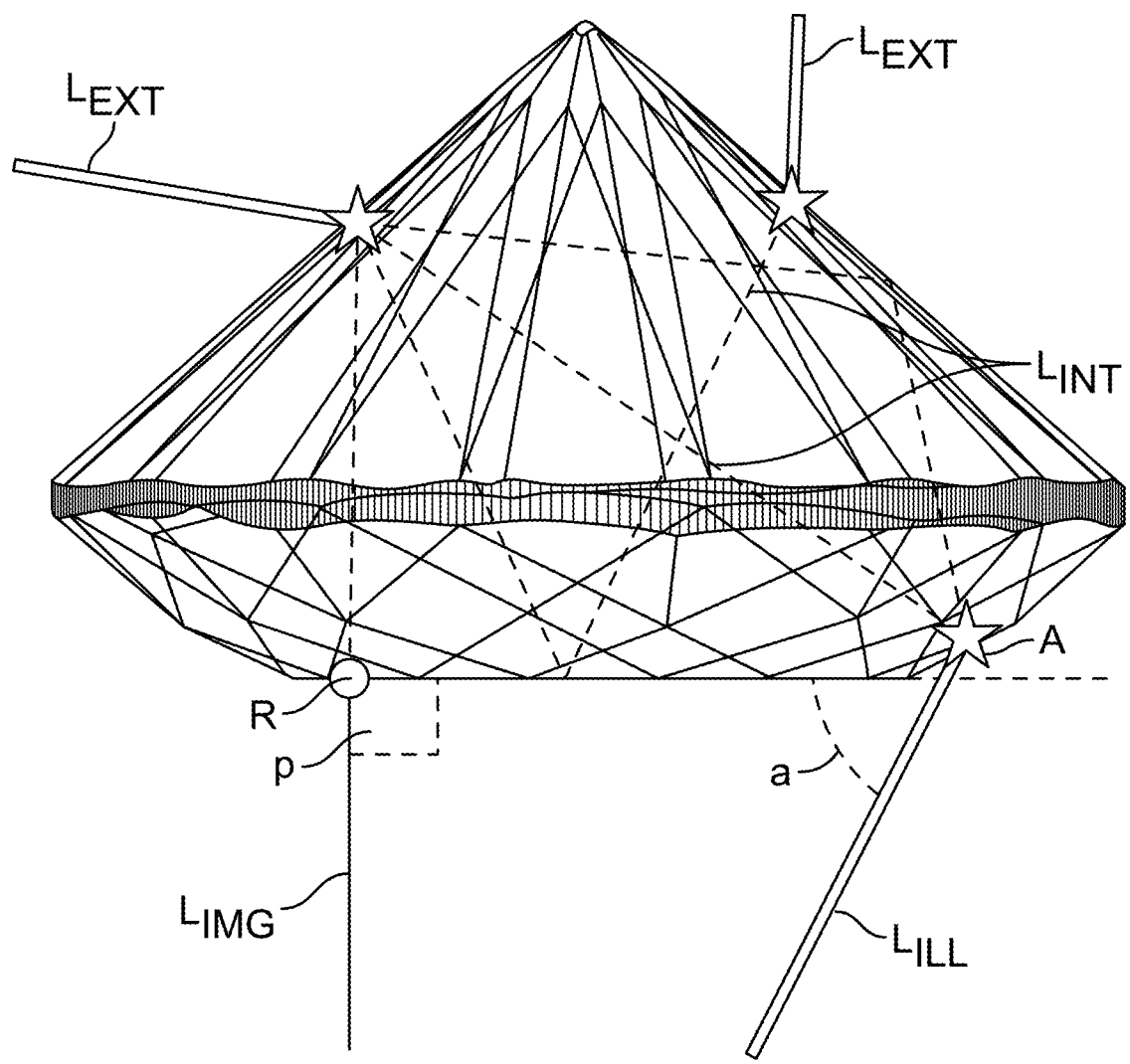
FIG. 4A shows a 3D model of a cut diamond with a trajectory of one light beam therein, of the kind that can be used in a method according to an embodiment of the presently disclosed subject matter.

The system 1 may also comprise a user interface 9. The user interface 9 may present a live view of the acquisition device 14 and the system may be operated therefrom. FIG. 4A illustrates how the ray tracing is used to determine an entrance area and entrance direction for one incident illumination beam, given its desired exit region and exit direction. Thus, FIG. 4 shows a 3D model of an example of a diamond, one incident illumination light beam LILL, and its trajectory between a predetermined entrance area A, at which the incident light beam LILL impinges the diamond from a predetermined direction defining with the diamond table an entrance angle a, and a predetermined exit region R, at which a corresponding imaging light beam LilVIAG exits this region in a predetermined direction defining with the diamond table an exit angle p, which is the direction of the image acquisition device 24. The light beam thus undergoes a number of interactions with the diamond's facets, resulting in its being split into an internal beam LINT, which after having entered the diamond at the entrance area A, continues travelling within the diamond by reflection from its facets, and one or more refracted beams LExT, which exit the diamond at regions other than the predetermined exit region R.

Figure 4B:
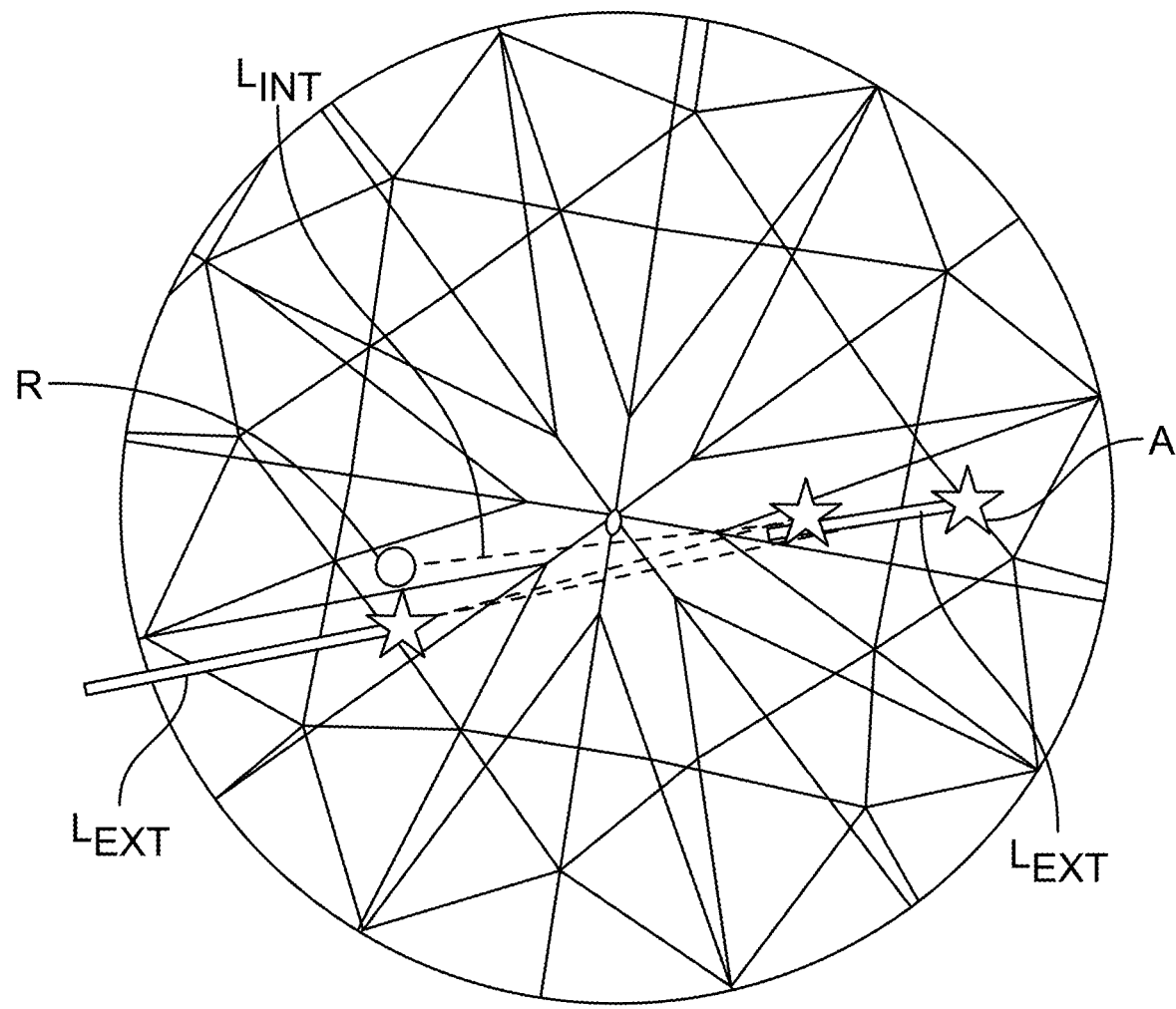
FIG. 4B is a top view of the 3D model shown in FIG. 4A, without the light beam, in which an exit region is marked, whose uniform internal illumination can be achieved by a combination of internal light beam including the light beam of FIG. 4A.

A combination of a sufficient number of the internal light beams LINT created by the simultaneous operation of the illumination system, whose trajectory has been calculated so as to exit the region R in the same direction as the beam LIMAG, allows this region to be internally illuminated with a uniformity of such internal illumination being higher to a desired extent than that of other regions of the diamonds. FIG. 4B illustrates such exit region R.

The system also includes an image processor 7 configured to process images captured by the image acquisition device and identify inclusions within the diamond based on deviation of uniformity of the internally illuminated exit regions R from the corresponding uniformity which should have been provided by the internal light beams LINT corresponding to the imaging light beams LIMAG, which were expected to participate in the imaging of the exit regions R. The processor can further be provided with a suitable software to determine clarity grade of the diamond based on the detected inclusions.

More particularly, with given parameters of illumination provided by the system in each image capturing session, it is expected that the exit regions R selected for this section will be internally illuminated with a pre-determined illumination uniformity. In an image of this region, the illumination uniformity differs from the pre-determined one for these exit regions R, it is suspected to be caused by an inclusion that changed the anticipated trajectory of the corresponding internal light beams LINT.

The image processor thus processes the plurality of images captured by the acquisition device in all the image capturing sessions and identify inclusions based on the non-uniformities in the internal illumination detected in these images at the exit regions that were expected to be uniformly internally illuminated. The detection of such non-uniformities can be performed by any appropriate manner. For example, the detection can be performed by at least one of the following: (i) comparing images of the predetermined light exit regions with their ray-tracing simulated images calculated under the assumption that these regions were internally illuminated uniformly; and/or (ii) comparing brightness/intensity of the light exit regions in their images with a pre-calculated expected brightness/intensity.

In each of the above options (i) and (ii), the comparison can be facilitated by using simulation of the gemstone to recognize edges of the diamond that can lead to false-positive detection results and to exclude them from being considered as potentially detected inclusions.

Other false-positive detection can occur due to dust or other foreign particles that can adhere to the outer surface of the diamond. Identification of such false-positive detections for their further exclusion from the detection results can be carried out, for example, by illuminating the outer surface of the diamond with UV light and acquiring images of the illuminated outer surface to detect light emitted by the particles, if any, under the influence of the UV light. This option is based on a known phenomenon that a fluorescent substance emits light of a distinct color in the visible region of the spectrum when the radiation absorbed thereby is in the UV region of the spectrum, and thus invisible to the human eye and/or various detectors such as color CCD cameras.

Figure 2A:
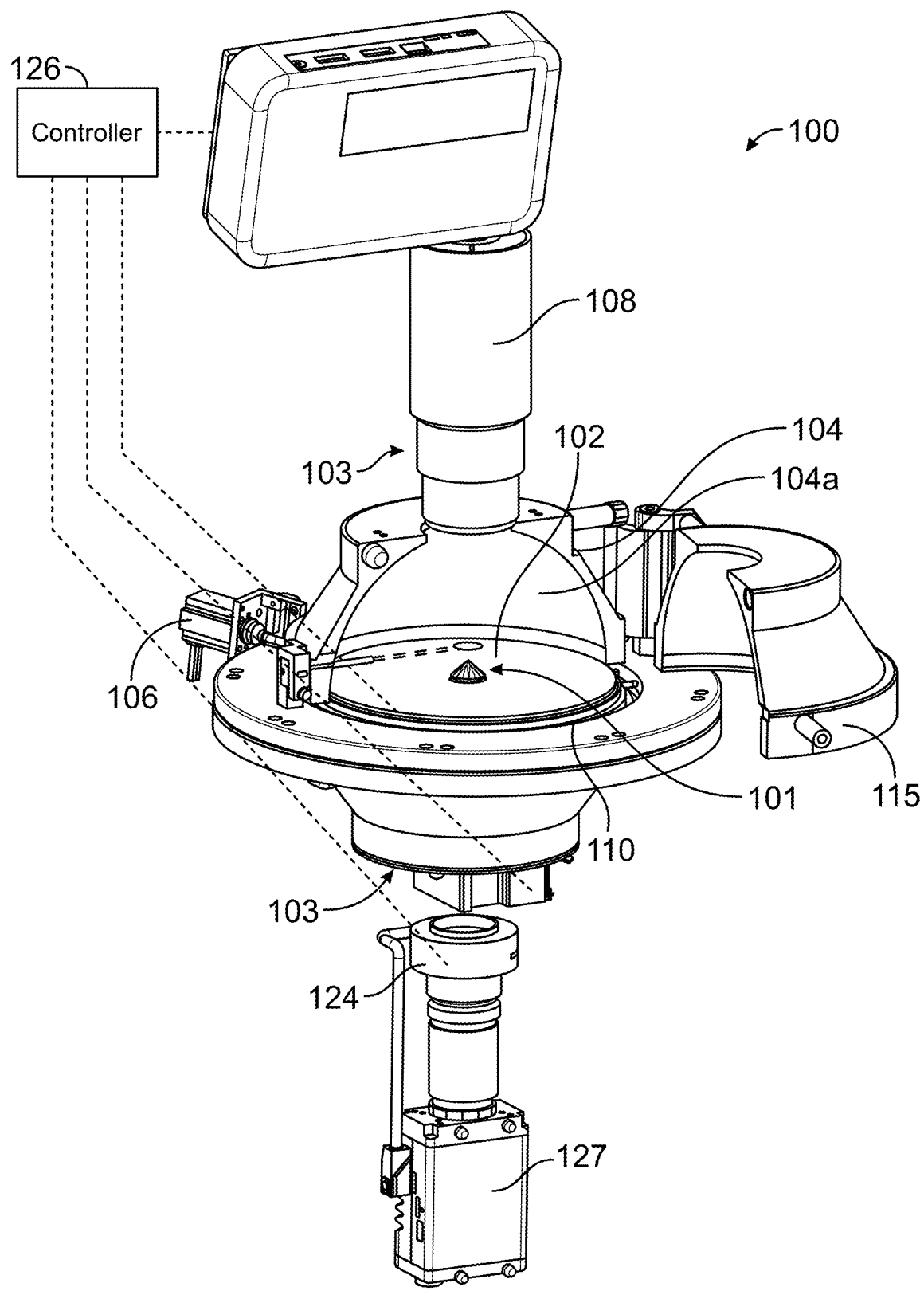
FIG. 2A is an isometric view of a device having a set-up similar to that shown in FIG. 1, according to an embodiment of the presently disclosed subject matter, the view showing a detection chamber of the device as being partially open.
Figure 2B:
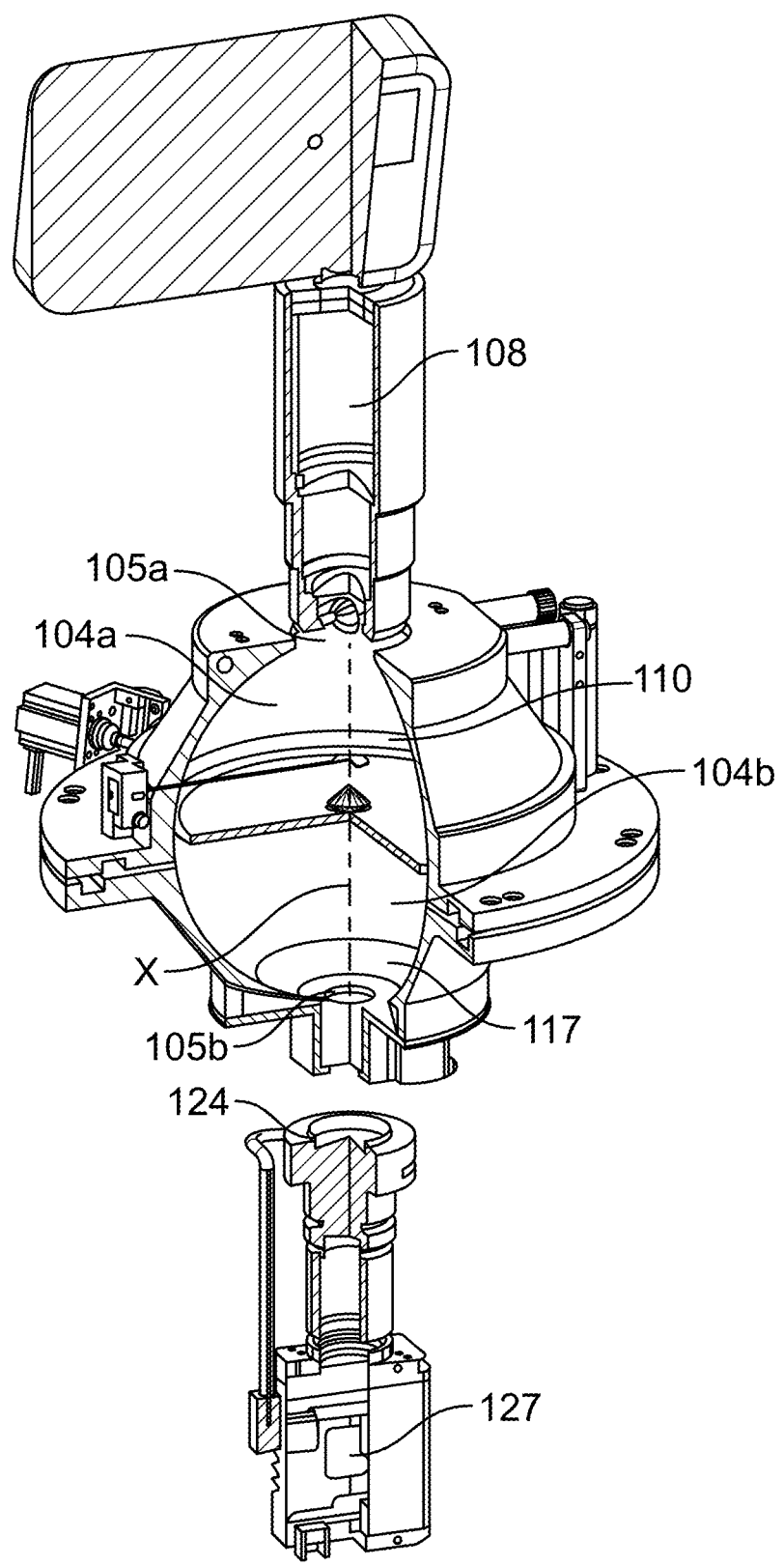
FIG. 2B is an isometric view of the device of FIG. 1, with a 90 deg. cutout extending along a central axis of the system.
Figure 3:
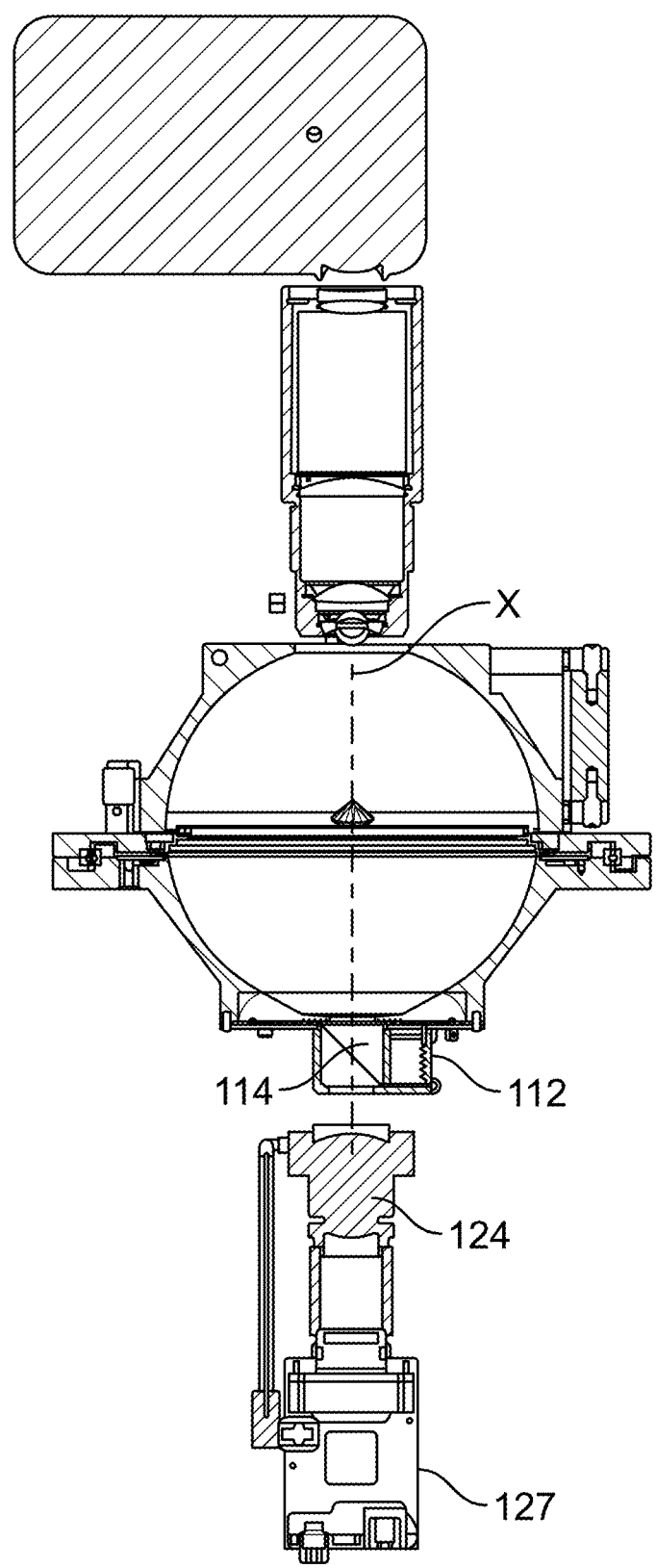
FIG. 3 is a cross-sectional front view of the device shown in FIGS. 1 and 2, taken along a plane containing its central axis.

FIGS. 2A, 2B and 3 illustrate one specific manner in which the system 1 described above can be implemented.

Thus, a system 100 shown in FIGS. 2A, 2B and 3, has components similar to those of the system 1 described above with reference to FIG. 1. In particular, as best seen in FIG. 3, the system 100 has a central axis X and comprises a transparent round table 102 having a diamond supporting surface 101 and positioned in the middle of a sphere 104 for mounting a diamond thereon with its table facet contacting the supporting surface 101 of the table 102. The table 102 can have the capability of movement by a centering device 106 that can move the table in a plane perpendicular to the central axis X, and/or rotate the table around this axis. The movement of the transparent table 102 can facilitate aligning the diamond with the central axis, if necessary.

The sphere 104 constitutes a part of an illumination system 103 and it comprises lower and upper halves having lower and upper hemispheric diffusively reflecting surfaces 104a and 104b, respectively, formed with a bottom opening 105a and a top opening 105b located at the bottom and the top of the lower and upper hemispheres, respectively, such that the central axis X passes through the centers of the openings.

The illumination system 103 further comprises the following light sources:

a top light source 108, which in this example is in the form of a projector configured to illuminate the lower hemispheric diffusively reflecting surface 104a via the opening 105b and to be controlled to provide a variety of illumination configurations on the diffusively reflecting surface 104a such that each illuminated spot on this surface may be illuminated in a different intensity;

a central light source 110 configured to illuminate the hemispheric upper surface 104b; in the present example, the central light source is in the form of an array of LEDs disposed annularly around the table 102 closer to the table than at least a majority of the upper hemisphere 104b; the LEDs can illuminate portions of the diffusively reflecting surface 104b so as to provide the desired illumination pattern; and a lateral bottom light source 112 spaced from the axis X and associated with a beam splitter 114 disposed on the central axis X, both located at the exterior of the lower surface 104b and configured to provide illumination of a central area of the table, which is to be contacted by the table facet of the diamond when positioned on the table, by light beams passing via the opening 105a and parallel to the central axis X; the bottom light source 112 can be, for example, in the form of a projector, light bulbs array or LEDs array, which can optionally be coupled with a diffuser.

A central bottom light source 117 surrounding the opening 105b to illuminate the diamond directly from directions that cannot be obtained by the other light sources, more particularly, by the top light source 108 because of its inability to illuminate the lower hemispheric diffusively reflecting surface 104a due to the line-of-sight blockage by the diamond.

The combination of the hemispheric diffusively reflecting surfaces 104a and 104b with the bottom, top and central light sources 108, 110 and 112, respectively, provides the illumination system 103 with an ability to selectively illuminate areas on most, if not the entire, surface of the diamond, each area may be selectively illuminated with a desired intensity provided by said lights sources, so as to obtain internal illumination of pre-selected light exit regions on the diamond with a desired degree of illumination uniformity as described above.

The system 100 further comprises an image acquisition device in the form of a camera 124, configured to capture images of the diamond through the beam splitter 114. The camera 124 can be operable in a variety of depths of focus. For example, its depth of focus can be such as to have the entire height of the diamond in focus. In another example, the camera can have a short depth focus and be manipulated by an actuator 127 configured to change location of the camera's focal plane for scanning the entire diamond with high accuracy by capturing a plurality of images, slice by slice, to cover the entire depth of the diamond. In the described example, the actuator 127 is used to move the camera 124 along the axis X.

The system 100 is configured for being operated by a controller 126. The controller 126 is configured to operate the illumination system 103 to provide a plurality of illumination patterns based on corresponding instructions received thereby from an external ray-tracing simulation system or calculated thereby based on data received from an external ray-tracing simulation system. In the present example, each such illumination pattern can be defined by a plurality of illuminated zones produced on one or both diffusively reflecting hemispheres 104a and 104b in a desired intensity by selective illumination thereof by the projector 108 and LEDs 110, respectively, so as to make sure that light beams diffusively reflected from said zones will include such incident illumination beams that will enter the diamond at predetermined entrance areas thereof in pre-determined orientations, as explained above with reference to FIG. 4. If necessary, further incident illumination beams can be provided by the light source 112. Examples of such illumination patterns on one of the diffusive hemispheres created by the system shown in FIG. 2A to 3 are presented in FIGS. 6A-6C. As shown, each such pattern includes a combination of selectively illuminated zones 128.

As explained above with reference to FIG. 4, each incident illumination beam that will enter the diamond at a predetermined entrance area thereof in pre-determined orientation, will participate in internal illumination of the corresponding pre-determined light exit region. To exemplify this with respect to the system shown in FIG. 2A to 3, reference is made below to FIGS. 5A-5F.

Figure 5C:
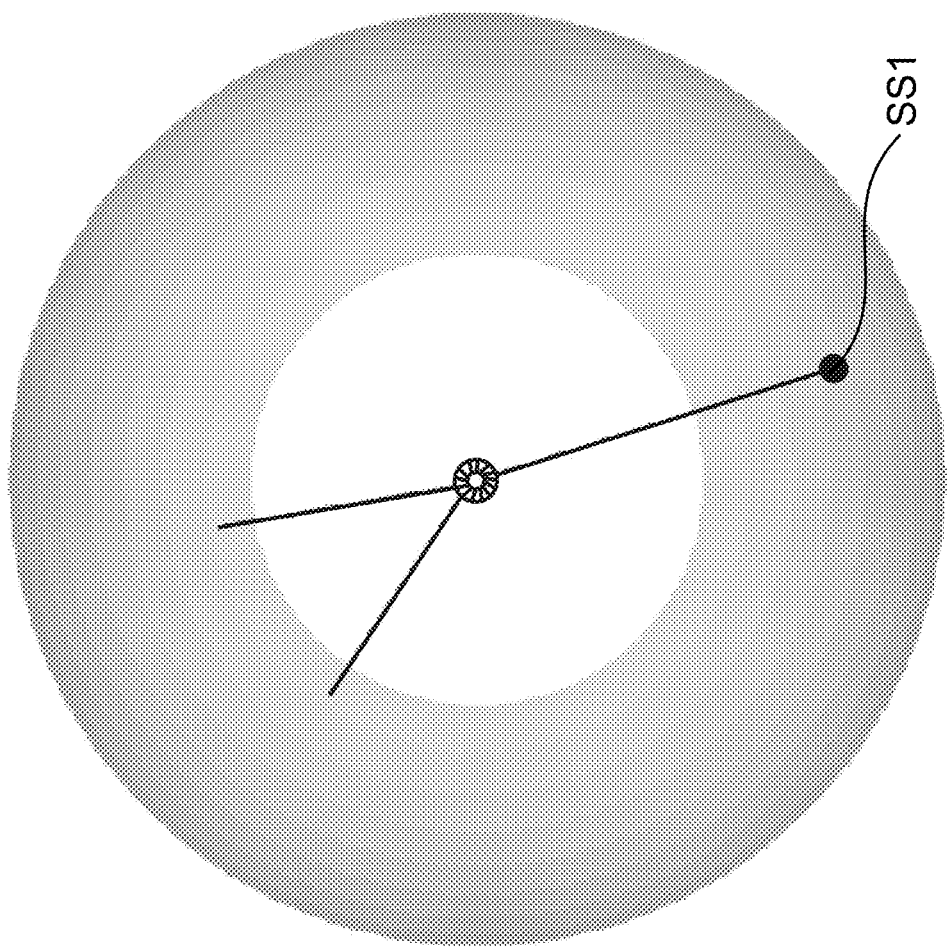

FIG. 5A shows an illustration of a diamond in its top view, including reflections of edges that can be seen in this orientation. A spot SD1 is located on the table facet of the diamond, which constitutes in this example its desired light exit area. FIGS. 5B and 5C show the lower diffusively reflecting hemisphere 104a with a corresponding spot SS1 thereon that needs to be illuminated to create such an incident beam on the diamond that will have an internal trajectory ending in participating in the internal illumination of the spot SD1 and in a corresponding imaging light beam exiting from the spot SD1 in the direction of the camera 124.

Figure 5E:
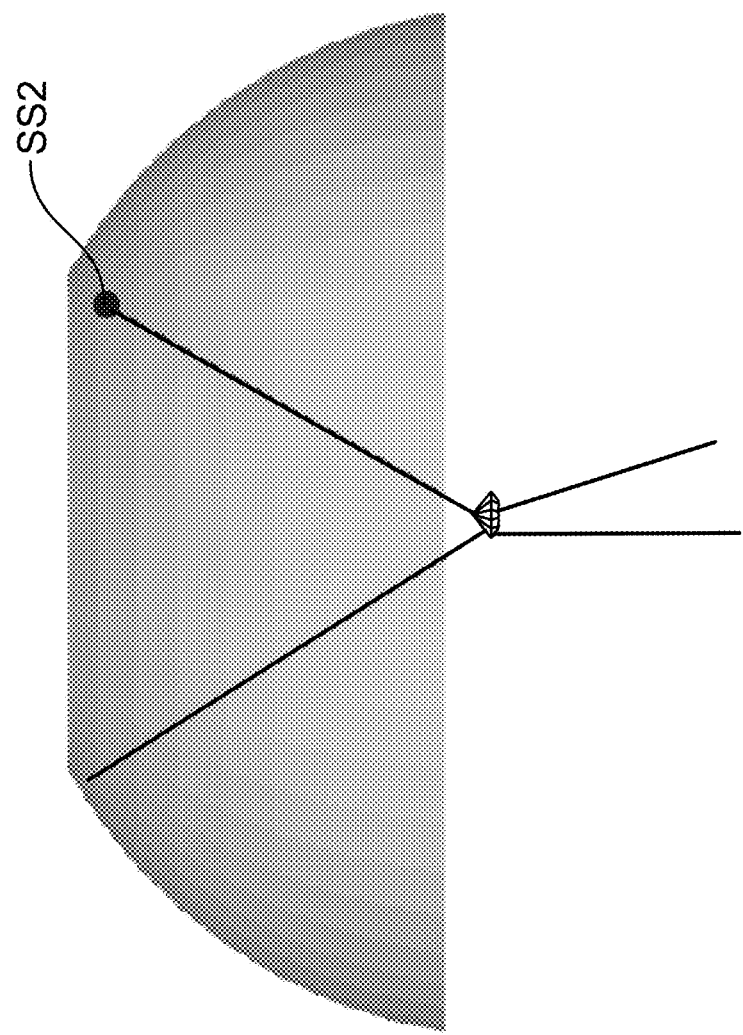
FIGS. 5E and 5F are respective side and plan views of the upper hemisphere and the table with a cut diamond disposed on the table and a schematic indication of an area on the upper hemisphere, from which a light beam has to be reflected towards the cut diamond, to have such a trajectory within the cut diamond as to provide internal illumination of the spot thereon shown in FIG. 5D.
Figure 5D:
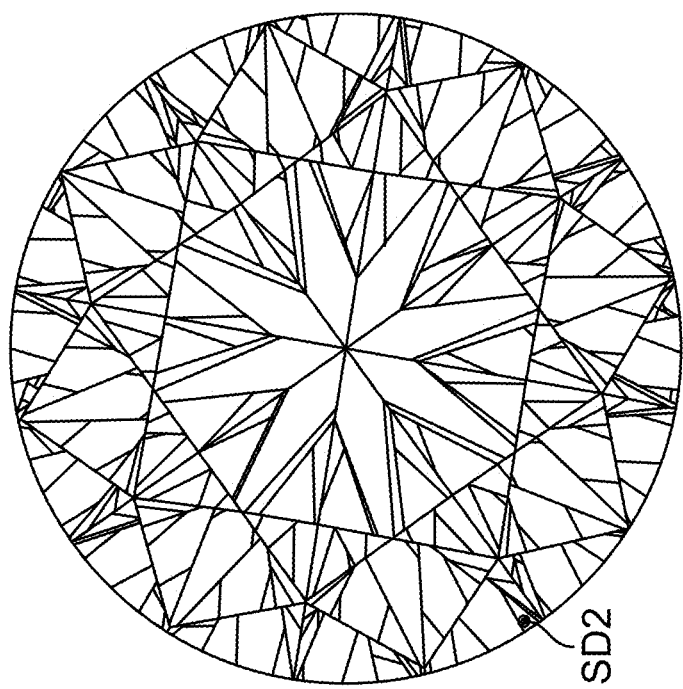
Figure 5F:
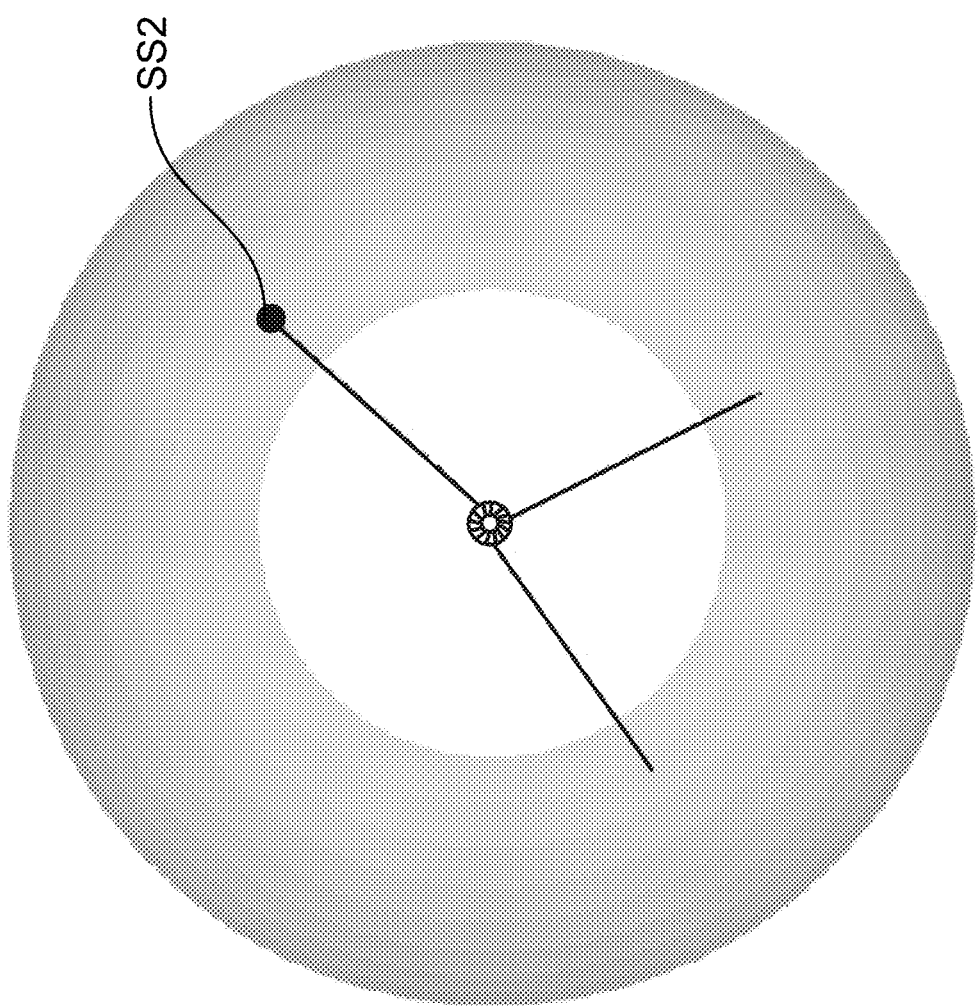

FIG. 5D shows another example of a model of a diamond in its top view, with a spot SD2 located on the diamond's crown, constituting its desired light exit area, and FIGS. 5E and 5F show the upper diffusively reflecting hemisphere 104b with a corresponding spot SS2 thereon that needs to be illuminated to create such an incident beam on the diamond that will have an internal trajectory ending in participating in the internal illumination of the spot SD2 and in a corresponding imaging light beam exiting from the spot SD2 in the direction of the camera 124.

Figure 7B:
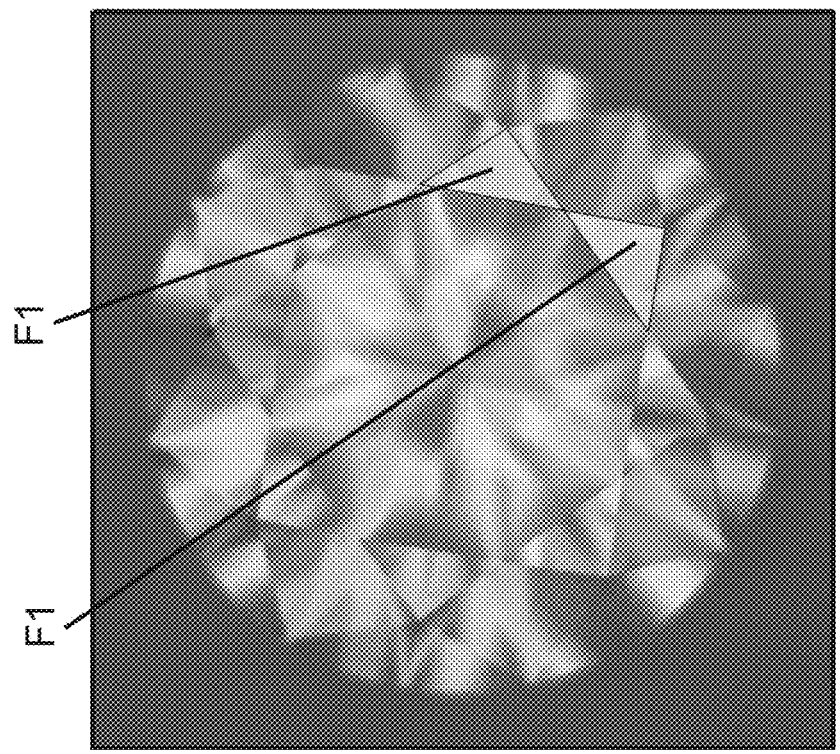
FIGS. 7A and 7B each is a plan image of a diamond obtained in a device of the kind shown in FIGS. 2A to 3, the diamond having two facets illuminated internally with a higher illumination uniformity than other facets of the diamond.
Figure 7A:
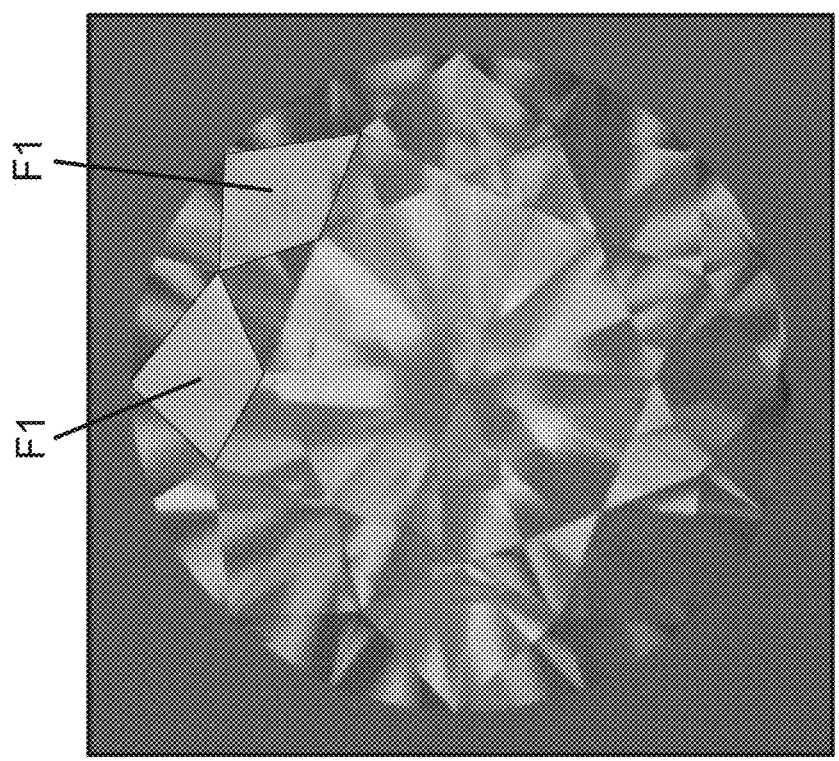

FIGS. 7A and 7B are two images of a diamond, each taken in one image capturing session in which the diamond was illuminated by a unique illumination pattern calculated so as to provide uniform internal illumination of two facets F1 and F2 of the diamond in the image of FIG. 7A, and two other facets F3 and F4 of the diamond in the image of FIG. 7B (marked by closed lines). As seen the indicated facets are illuminated more uniformly that any other facets seen in the same images. As explained above unique illumination patterns were pre-calculated and the controller 126 operated the illumination system 103 to provide them.

Figure 8A:
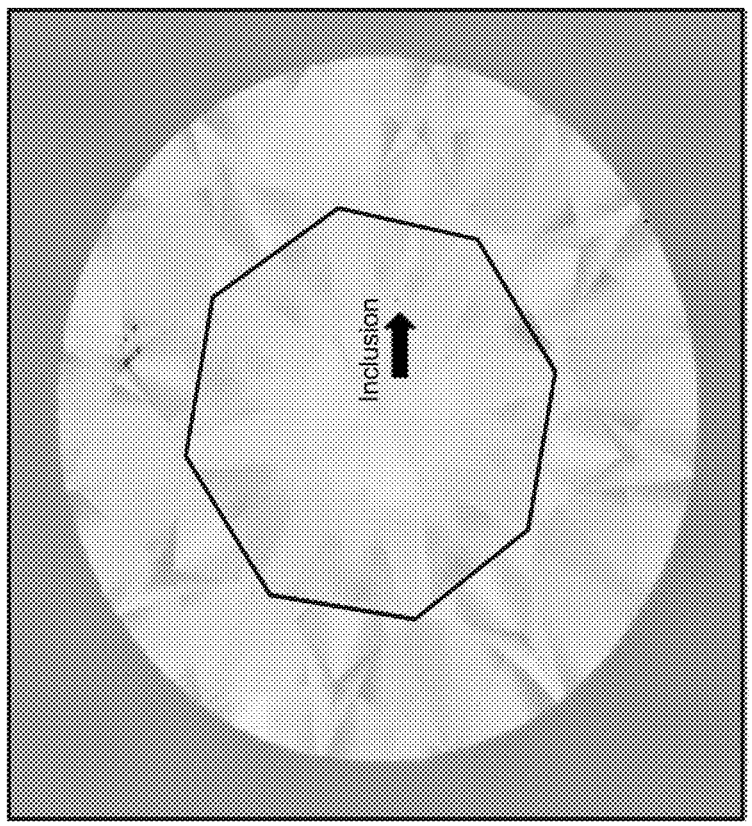
FIGS. 8A-8C each is a plan image of a diamond obtained in a device of the kind shown in FIGS. 2A to 3, where an inclusion (FIGS. 8A and 8B) or reflected image of an inclusion (FIG. 8C) is seen at a facet, which would otherwise be illuminated internally with a higher illumination uniformity than other facets of the diamond.
Figure 8B:
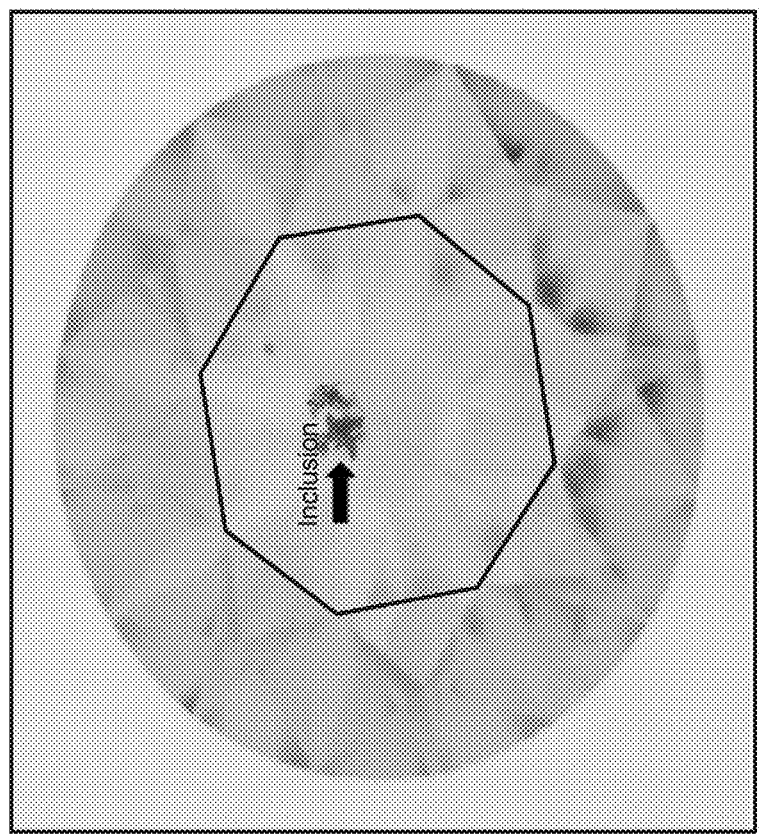
Figure 8C:
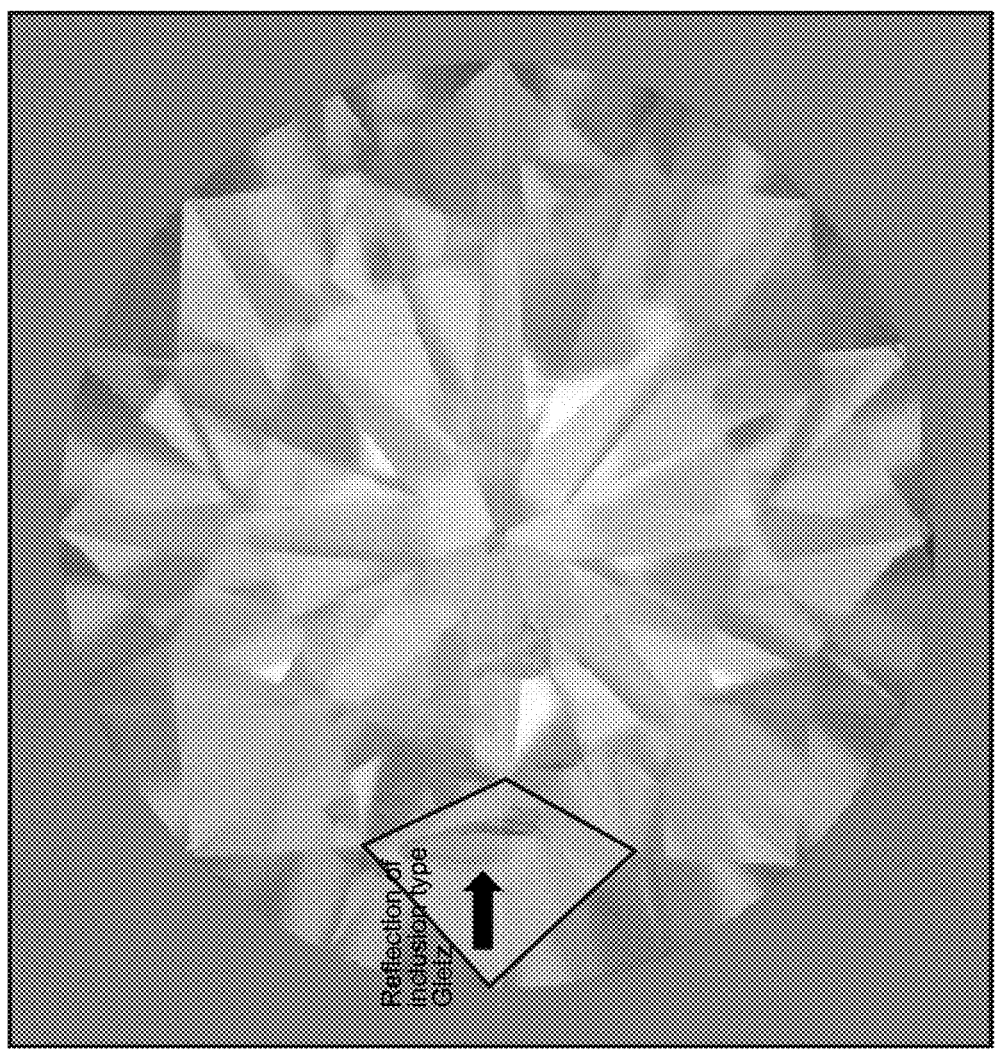

The system further comprises an image processor (not shown) configured to operate in the same manner as the image processor 7 described above, to detect inclusions in the diamond. FIGS. 8A-8C are images of diamonds, in which light exit regions that were intended to be uniformed internally illuminated (marked by closed lines) have non-illuminated or poorly illuminated areas corresponding to a detected inclusion.

Figure 9:
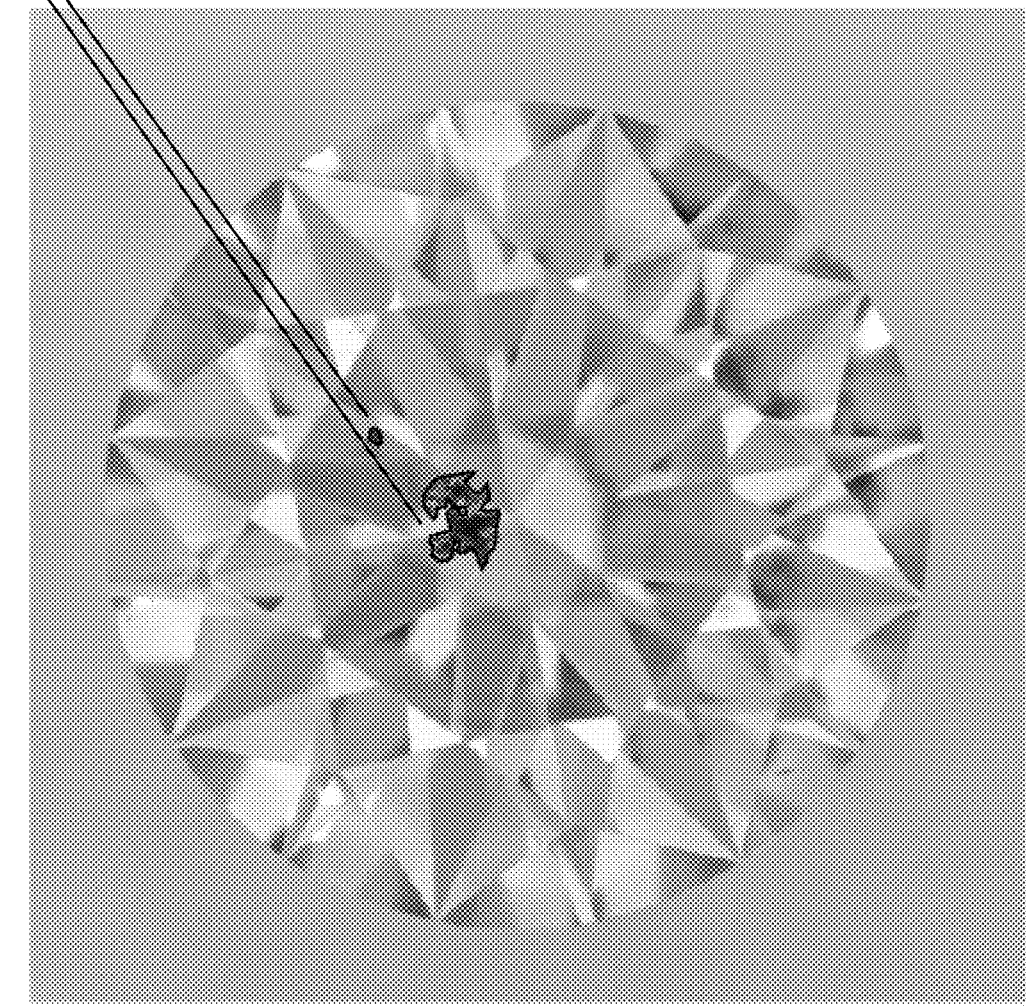
FIG. 9 shows an illustrative image of a diamond with inclusions marked therein after they have been detected by a device of the kind shown in FIGS. 1 and 2.

The system can further comprise a display or a user interface, where a top view of the diamond can be presented with a detected inclusion marked therein. An example of such presentation is shown in FIG. 9. Further to the marking of the inclusion, a variety of details can be added regarding to the marked inclusion such as its location in the diamond, its size, type or any other criteria relating to inclusions.

Examples of inclusions that can be detected by the above-described systems are Gietz, Crystal, Pinpoint and Feather. Their sizes and locations can correspond to clarity grades up to VVS (Very, Very Slightly Included) grading.

Inclusions that might need special illumination other than that provided by the upper and lower illumination subsystems described above, are very little, colorless inclusions, e.g., such as clouds. Using dark field illumination, these inclusions can be highlighted and thus detected.

Figure 10C:
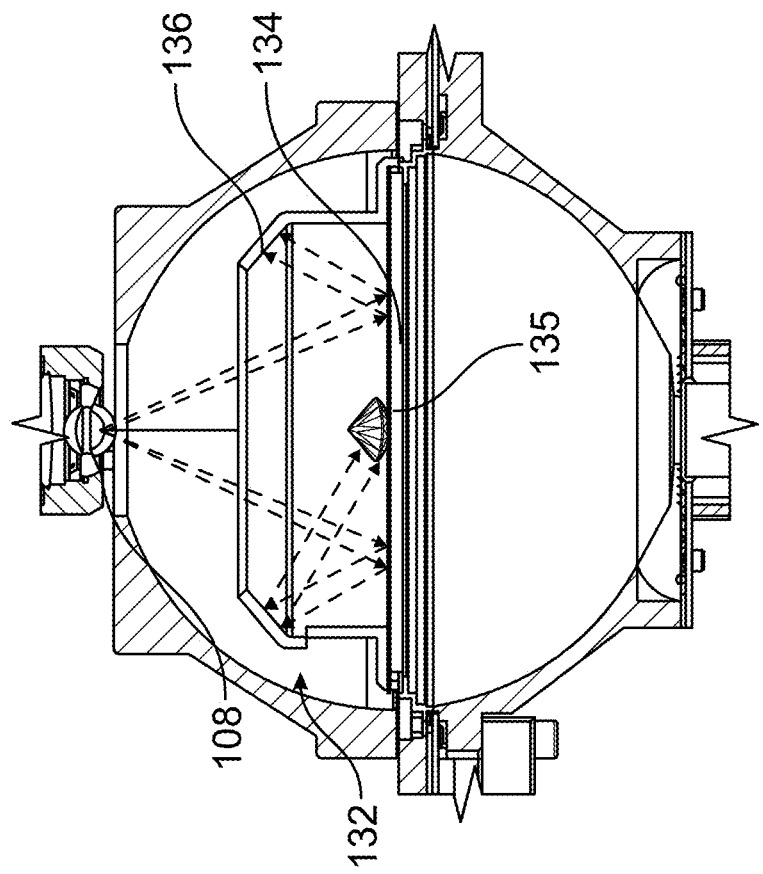
FIG. 10C is an enlarged view of the device shown in FIG. 10B, with a schematic illustration of the trajectory of light beams emitted by the projector of the system and reflected by the dark illumination device, to obtain a desired illumination pattern on a diamond.
Figure 10B:
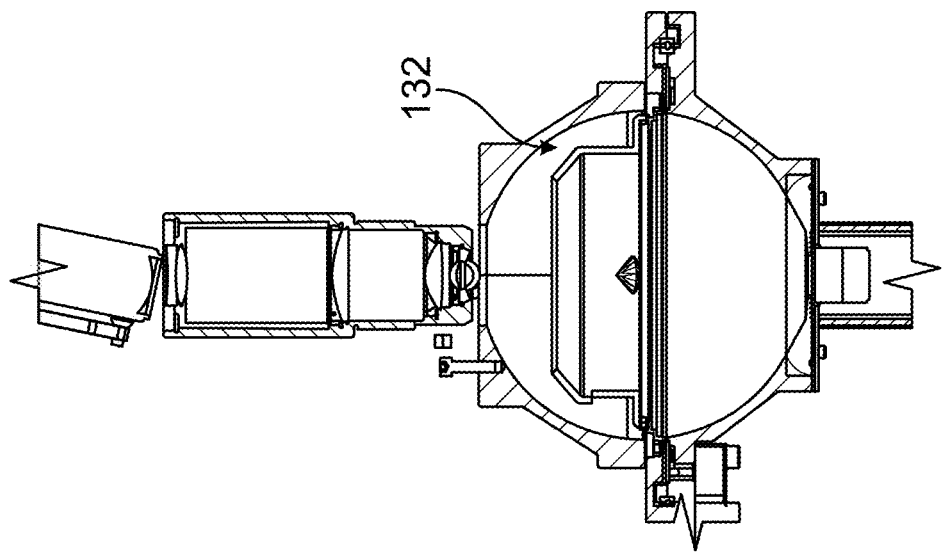
FIG. 10B is a front view of the system shown in FIGS. 2A to 3, with the dark-field illumination device in FIG. 10A, mounted therein.

To provide such dark-field illumination in the above-described system 100, an add-on dark-field illumination device 132, e.g., such as shown in FIG. 10A, can be used therein in a manner shown in FIGS. 10B and 10C. The add-on dark-field illumination device 132 has a central axis of symmetry C and is configured to be placed on the table 102 coaxially with the axis X of the system, so as to cover a majority of an area of the table surrounding its central area 133, where a diamond is to be placed (which should be large enough to accommodate a diamond of a maximal diameter, which the system is configured to detect), and so as to receive illumination from the first light source 108. The device 132 comprises an annular flat wall with a reflecting surface 134, which for example can be in the form of a mirror, and a frusto-conical wall with a reflecting surface 136, the latter wall being spaced from the former wall along the axis C so that when the device 132 is placed on the table 102, the flat wall is in contact therewith and the frusto-conical wall is disposed above the flat wall. The annular flat reflecting surface 134 has central circular hole 135 of an inner diameter d1 corresponding to that of the central area of the table 102 and it has an outer diameter d2 large enough to make sure that, when the device is placed on the table, all light from the first light source 108 emitted towards the table 102 around the central area thereof will impinge the reflecting surface 134. At least a portion of the device 132 is open at its top to permit the passing of the light beams of a pre-determined illumination pattern from the first light source 108 into the flat reflecting surface 134, when the device 132 is mounted on the table 102.

The frusto-conical reflecting surface 136 is so inclined with respect to the flat reflecting surface 134 that, when the device is placed on the table 102, light beams emitted by the first light source 108 in accordance with the pre-determined pattern and reflected by the flat reflecting surface 134 impinge the frusto-conical reflecting surface 136 and are further reflected thereby towards the central circular hole 135 so as to illuminate the diamond's pavilion at different heights thereof. Examples of such trajectories of light beams are shown in FIG. 10C.

In operation of the system with the add-on device 102, the first light source 108 is controlled by the controller 126 to provide the above pre-determined illumination pattern on the flat reflecting surface 134, resulting in the illumination of the pavilion of the diamond mounted on the central area of the table 102 by beams reflected from the frusto-conical reflecting surface 136. Incident beams thus created enter the interior of the diamond and, in the absence of any inclusions, exit the diamond in a direction other than the direction of the camera 124. Thus, only light encountering the inclusions within the diamond is expected to be captured in the camera and little and colorless inclusions can be detected easily. Simulation of such dark field illumination can be input to the controller from the above-mentioned simulation system or can be calculated by the controller itself based on a 3D model of the diamond and the corresponding ray tracing.

The operation of the system generally requires isolation of the system from an external light; thus, the sphere is usually covered by a non-penetrating light material. However, a portion of the cover is a movable cover 115, as shown in FIG. 2A, having a closed and open states (shown only in its open state) thus enabling the reach to the interior of the sphere for any kind of reason such as placing the diamond or for maintenance reasons.

As explained above, it is optional that prior to detecting the diamond D in the system described above, its 3D model is obtained, e.g., by means of an external 3D mapping system provided with a ray tracing capability and illumination simulation capability.

In operation, the diamond D is placed on the table, the diamond is aligned with the camera, and if necessary, it is also aligned with the received ray tracing simulation I 3D model. The alignment is obtained by moving I rotating the transparent table and it can be done manually by the operator or automatically by the system. The alignment is carried out by using a top view imaging of the diamond.

Figure 11A:
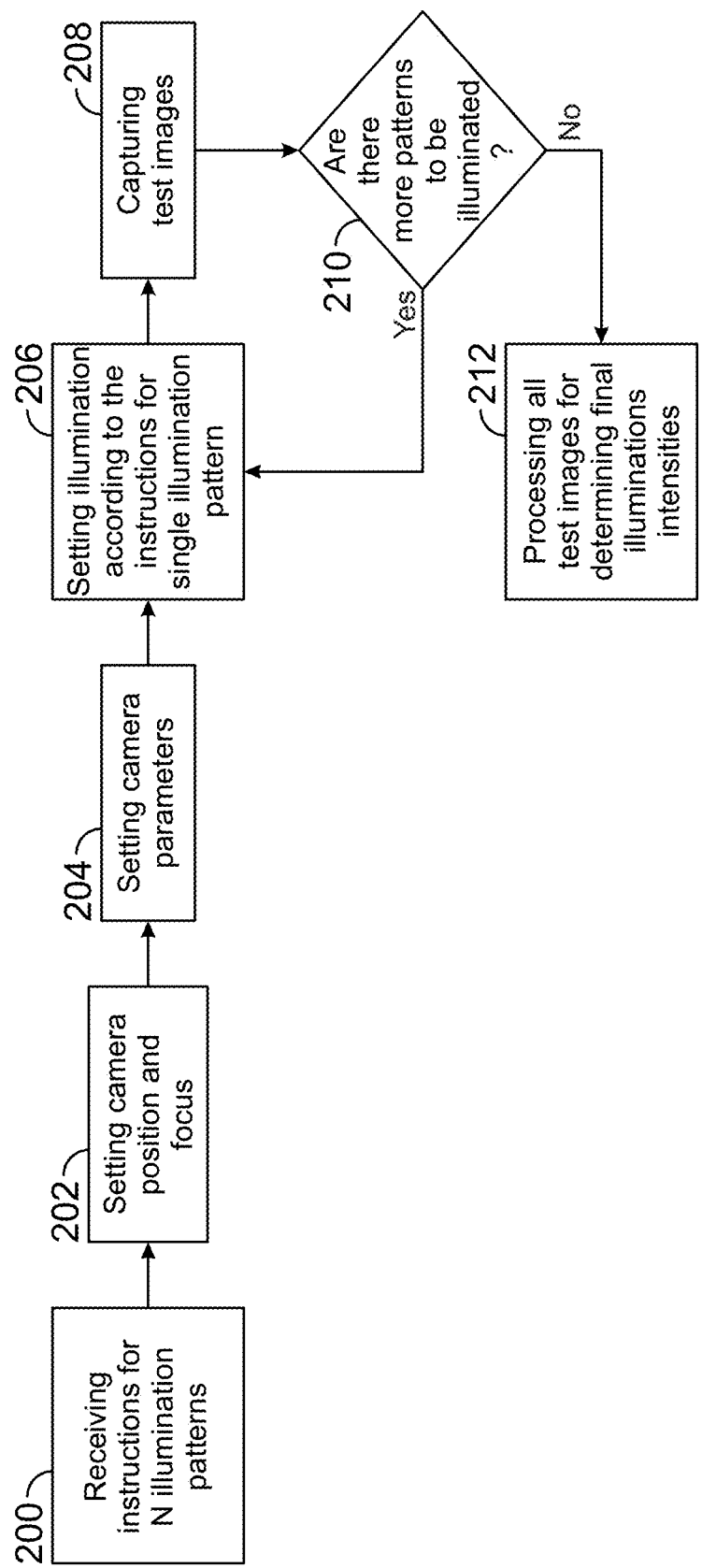
FIG. 11A is a block-diagram scheme exemplifying a preparatory phase of a method for detecting inclusions in a gemstone, in which illumination intensities are adjusted.
Figure 11B:
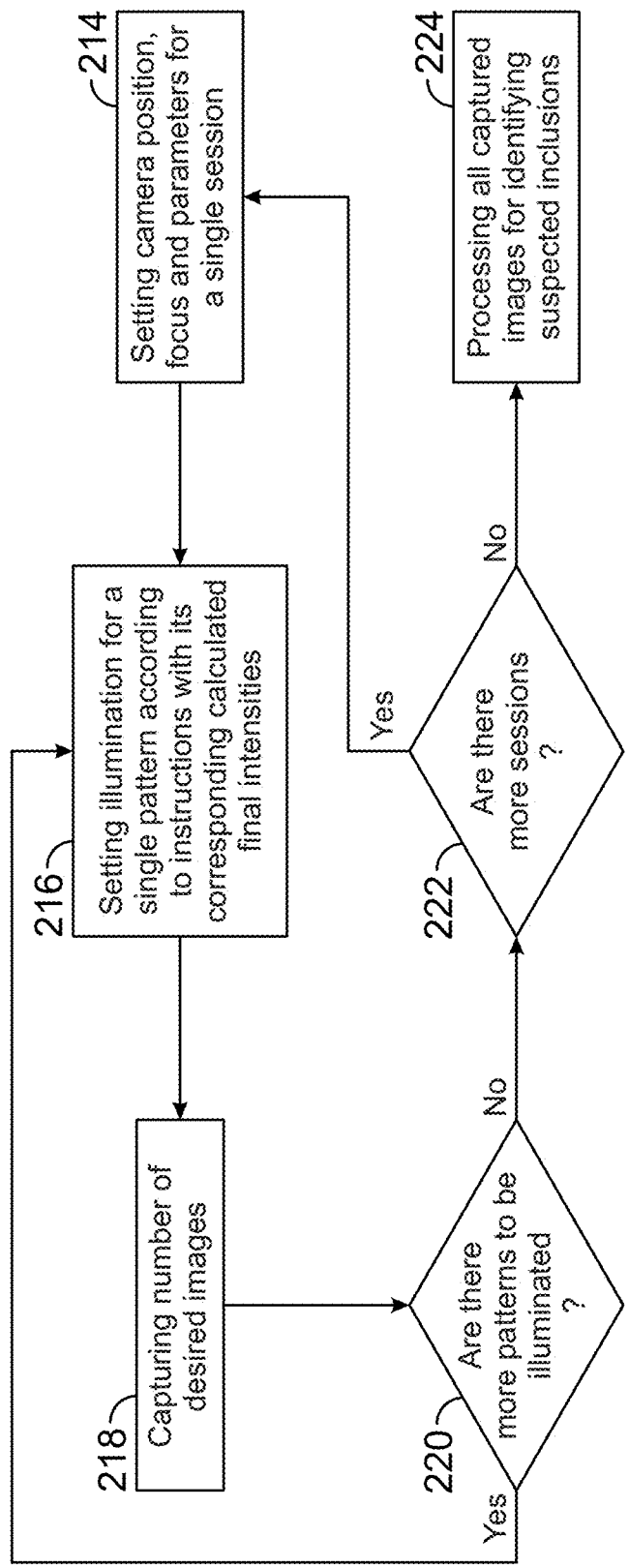
FIG. 11B is a block-diagram scheme exemplifying a method for detecting inclusions in a gemstone in accordance with an embodiment of the presently disclosed subject matter.

FIGS. 11A and 11B illustrate one example of a method for detecting inclusions in a diamond using the system 100 described above under the control of the controller 126, including a first, preparatory phase, illustrated in FIG. 11A, and a second, detection phase, where the detection of inclusions is carried out in a plurality of image capturing sessions with the illumination intensities at the entrance areas, determined at the preparatory phase. In the present example, each such session includes taking images of the diamond illuminated successively by all the illumination patterns at one focal position within the diamond.

Referring to FIG. 11A, in step 200 data/instructions are received regarding the specific diamond, whether derived from an external system or a local database. These instructions include an illumination pattern for each combination of light exit regions, which are to be internally illuminated simultaneously, with the total number N of such patterns and corresponding combinations of the light exit regions. The instructions also include data regarding initial intensities, with which the illumination patterns are to be provided at this phase.

In step 202, the camera 124 is set so as to have the entire diamond in its field of view for capturing images thereof at least at one focal position in the interior of the diamond. Additionally, in step 204 all the parameters of the camera are set, such as exposure, ISO, etc.

In step 206, the illumination is set according to the received instructions for illumination pattern no. 1 and its initial intensities and in step 208, one or more test images of the diamond are captured, and these steps are repeated N times (step 210).

In step 212, the captured test images are processed, using simulation software, for determining final illumination intensities needed to be provided in each illumination pattern in order to obtain uniform internal illumination of the corresponding light exit regions.

Referring to FIG. 11B, the detection phase is now performed, where the detection of inclusions is carried out in a number of image capturing sessions corresponding to the desired number of positions of focal plane of the camera within the diamond, at which the diamond images are to be captured.

In step 214, the camera is set to a first position of its focal plane. This step can also include setting other parameters of the camera if it is desired to change them between different image capturing sessions.

In step 216, illumination pattern no. 1 is set according to the received instructions and the calculated final intensities to obtain the corresponding exit regions having a uniform internal illumination.

In step 218, number of desired images are being captured. In step 220, steps 216 and 218 are repeated N times in each session, for N illumination patterns. If there are more depths to be examined in the diamond, namely more sessions to be carried out as in step 222, then steps 214, 216, 218 and 220 are repeated.

In step 224, all the captured images are processed for identifying suspected inclusions. It should be noted that the images may be sent to the processor during the session or after each session and not necessarily at the end of all sessions.

The processing output of step 224 can be, for example, in the form of an image of the diamond with marked inclusions. It can also include data relating to the inclusions such as their size, depth, type etc. Furthermore, an optional output can be a clarity grading of the diamond.

It should be noted that the steps as presented are not limited to the described order and some steps can be taken before or after other steps or can be avoided.

The invention claimed is:

1. A system for detecting inclusions in a gemstone, comprising:
   a. a controller configured to direct an illumination system, an image acquisition device, an image processing system, and a storage system;
   b. the illumination system configured to selectively illuminate each of a plurality of spaced apart light entrance areas of a gemstone from corresponding illumination directions, and to provide a number of illumination patterns each defined by a unique combination of such light entrance areas illuminated simultaneously, and produce illumination patterns to simultaneously provide an internal uniform illumination of one or more predetermined light exit regions of the gemstone;

c. the image acquisition device configured to capture images of the gemstone when illuminated by the illumination system;
d. the image processing system configured for processing said images and identifying inclusions in the gemstone based on non-uniformities in the internal illumination detected in said images;
e. the storage system including a computer memory configured to store the images of the gemstone from the image processing system,
f. the controller further configured to compare a gemstone A to a gemstone B by:
  i. directing the image acquisition device to capture images of the gemstone A and the gemstone B,
  ii. directing the image processing system to analyze the images for the gemstone A and the gemstone B identifying inclusions,
  iii. storing, in the storage system, images of the gemstone A and the gemstone B from the processing system, and
  iv. comparing the stored images of a gemstone A and the gemstone B, and determining whether the stored images of the gemstone A and the gemstone B are a match and therefore whether a gemstone B is the same gemstone as a gemstone A that was sourced from a particular mine/source.

2. The system of claim 1, wherein if the stored images do not match, the controller is configured to calculate, based on the comparing, a matching score for the inclusions in gemstone A and in gemstone B, the matching score being informative of a match between the inclusions of gemstone A and gemstone B, and, the controller being configured to identify gemstone B as being the same or derived from gemstone A when the matching score meets a predefined matching criteria.

3. The system of claim 1, further comprising a transparent table configured for mounting a gemstone thereon so that, if the gemstone is a cut gemstone, its table facet faces the image acquisition device.

4. The system of claim 3, wherein the first hemispherical illumination surface is in the form of a first diffusively reflecting surface, and each of the first and the second illumination systems further comprise a first light source configured to selectively illuminates a plurality of zones on the first hemispherical illumination surface, the first reflecting surface and the first light source being disposed on two sides of the gemstone.

5. The system of claim 1, wherein the illumination system comprises a first hemispherical illumination surface.

6. The system of claim 5, wherein the system has an optical axis passing through a center of the first hemispherical illumination surface, and the latter surface comprises an opening surrounding said axis.

7. The system of claim 6, wherein the illumination system further comprises a third light source configured to illuminate the gemstone through said opening and/or the image acquisition device is configured to capture images of the gemstone through said opening.

8. The system of claim 1, further comprising a second hemispherical illumination surface.

9. The system of claim 8, wherein the second hemispherical illumination surface is in the form of a second diffusively reflecting surface, and the illumination system further comprises a second light source configured to selectively illuminates a plurality of zones on the second hemispherical illumination surface, the second reflecting surface and the second light source are disposed on the same side of the transparent table.

10. The system of claim 1, wherein the controller is configured to calculate the illumination pattern using a ray tracing model.

11. The system of claim 1, further being configured to capture the images of the gemstone at a plurality of depths along its height.

12. The system of claim 1, wherein the image processing system is configured to exclude false-positive detections, optionally obtained using one or both of the following:
  a. a simulation of the gemstone to recognize edges of the gemstone;
  b. imaging an outer surface of the gemstone, under illumination allowing to detect foreign particles on said outer surface.

13. The system of claim 1, further comprising a dark-field illumination device.

14. The system of claim 13, wherein said dark-field device comprises a combination of reflecting surfaces and is configured to be mounted so as to receive light from the illumination system while preventing direct entry of light beams from this source into the image acquisition device.

15. A computerized method for detecting inclusions in a gemstone and determining whether a gemstone B being analyzed is the same gemstone as a gemstone A that was sourced from a particular mine/source, comprising:
  (a) analyzing gemstone A by controlling an illumination system configured to selectively illuminate each of a plurality of spaced apart light entrance areas of the gemstone A from corresponding illumination directions, and to provide a number of illumination patterns each defined by a unique combination of such light entrance areas illuminated simultaneously, the controlling being configured to cause the illumination system to successively produce illumination patterns each selected so as to simultaneously provide an internal uniform illumination of one or more predetermined light exit regions of the gemstone;
  (b) capturing a plurality of images from the gemstone A when illuminated as defined in step (a);
  (c) analyzing gemstone B by repeating steps (a) and (b) for gemstone B;
  (d) processing the images and identifying inclusions in said images for gemstones A and B, based on non-uniformities in the internal illumination detected in said images; and,
  (e) comparing the processed images derived from gemstone A and gemstone B to determine whether the processed images match or do not match.

16. The method of claim 15, further comprising, if the processed images do not match, calculating, based on the comparing, a matching score for the inclusions in gemstone A and the inclusions in gemstone B, the matching score being informative of a match between the inclusions in gemstone A and gemstone B; and, identifying gemstone B as being the same or derived from gemstone A, when the matching score meets a predefined matching criteria.

17. The method of claim 15, wherein the illuminating is performed using a diffusively reflecting surface and at least one light source.

18. The method of claim 15, wherein, if a gemstone is a cut gemstone, the plurality of images is captured from a viewpoint facing a table facet of the gemstone.

19. The method of claim 15, further comprising providing a mapped illustration of detected inclusions within gemstones A and B.

20. The method of claim 15, wherein the illumination of said internal uniform illumination is based on a ray tracing model.

21. The method of claim 20, wherein the ray tracing model is based on a 3D modelling of the gemstone.

22. The method of claim 15, further comprising grading the clarity of a gemstone based on detected inclusions.

23. The method of claim 15, wherein said predetermined exit region comprises at least one facet of a gemstone.

24. The method of claim 15, wherein said detection comprises at least one of the following:
   a. comparing images of said predetermined light exit regions with their simulated images if these regions were illuminated uniformly; or
   b. detecting differentiation of illumination intensity of said regions relative to a predetermined intensity at said regions.

25. The method of claim 24, wherein said detection is using a simulation of the gemstone to recognize edges of the gemstone to reduce false-positive detections.

* * * * *